United States Patent
Berkovich et al.

(10) Patent No.: US 11,089,210 B2
(45) Date of Patent: Aug. 10, 2021

(54) CONFIGURABLE IMAGE SENSOR

(71) Applicant: Facebook Technologies, LLC, Menlo Park, CA (US)

(72) Inventors: Andrew Samuel Berkovich, Bellevue, WA (US); Xinqiao Liu, Medina, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 67 days.

(21) Appl. No.: 16/436,137

(22) Filed: Jun. 10, 2019

(65) Prior Publication Data
US 2019/0379827 A1    Dec. 12, 2019

Related U.S. Application Data

(60) Provisional application No. 62/683,563, filed on Jun. 11, 2018.

(51) Int. Cl.
*H04N 5/232* (2006.01)
*H04N 5/225* (2006.01)

(52) U.S. Cl.
CPC ....... *H04N 5/23229* (2013.01); *H04N 5/2254* (2013.01); *H04N 5/23254* (2013.01); *H04N 5/23264* (2013.01)

(58) Field of Classification Search
CPC ........... H04N 5/23229; H04N 5/23264; H04N 5/2254; H04N 5/23254; H04N 5/361;
(Continued)

(56) References Cited

U.S. PATENT DOCUMENTS

| 4,596,977 A | 6/1986 | Bauman et al. |
| 5,053,771 A | 10/1991 | McDermott |

(Continued)

FOREIGN PATENT DOCUMENTS

| DE | 202016105510 | 10/2016 |
| EP | 0675345 | 10/1995 |

(Continued)

OTHER PUBLICATIONS

U.S. Appl. No. 15/668,241, Advisory Action, dated Oct. 23, 2019, 5 pages.
(Continued)

*Primary Examiner* — Twyler L Haskins
*Assistant Examiner* — Angel L Garces-Rivera
(74) *Attorney, Agent, or Firm* — Kilpatrick Townsend & Stockton

(57) ABSTRACT

In one example, a method comprises: receiving programming data; determining, based on the programming data, at least one of: an integration period in which a charge storage unit including a floating drain accumulates charge received from a photodiode, or a number of times of sampling the charge; enabling the photodiode to accumulate residual charge, and to transmit overflow charge to the charge storage unit after the photodiode saturates; controlling the charge storage unit to accumulate at least a part of the overflow charge received from the photodiode within the integration period; controlling a quantizer to sample the at least a part of the overflow charge or the residual charge for the number of times to obtain the number of samples; and controlling the quantizer to quantize the number of samples to generate the number of quantization results.

26 Claims, 23 Drawing Sheets

(58) Field of Classification Search
CPC .... H04N 5/2256; H04N 5/2257; H04N 5/359; H04N 5/37455; H04N 5/3559
See application file for complete search history.

(56) References Cited

U.S. PATENT DOCUMENTS

| | | |
|---|---|---|
| 6,522,395 B1 | 2/2003 | Bamji et al. |
| 6,529,241 B1 | 3/2003 | Clark |
| 7,659,772 B2 | 2/2010 | Nomura et al. |
| 7,719,589 B2 | 5/2010 | Turchetta et al. |
| 8,134,623 B2 | 3/2012 | Purcell et al. |
| 8,144,227 B2 | 3/2012 | Kobayashi |
| 8,369,458 B2 | 2/2013 | Wong et al. |
| 8,426,793 B1 | 4/2013 | Barrows |
| 8,754,798 B2 | 6/2014 | Lin |
| 8,773,562 B1 | 7/2014 | Fan |
| 8,779,346 B2 | 7/2014 | Fowler et al. |
| 8,946,610 B2 | 2/2015 | Iwabuchi et al. |
| 9,094,629 B2 | 7/2015 | Ishibashi |
| 9,185,273 B2 | 11/2015 | Beck et al. |
| 9,274,151 B2 | 3/2016 | Lee et al. |
| 9,332,200 B1 | 5/2016 | Hseih et al. |
| 9,343,497 B2 | 5/2016 | Cho |
| 9,363,454 B2 | 6/2016 | Ito et al. |
| 9,478,579 B2 | 10/2016 | Dai et al. |
| 9,497,396 B2 | 11/2016 | Choi |
| 9,531,990 B1 | 12/2016 | Wilkins et al. |
| 9,800,260 B1 | 10/2017 | Banerjee |
| 9,819,885 B2 | 11/2017 | Furukawa et al. |
| 9,909,922 B2 | 3/2018 | Schweickert et al. |
| 9,948,316 B1 | 4/2018 | Yun et al. |
| 9,967,496 B2 | 5/2018 | Ayers et al. |
| 10,003,759 B2 | 6/2018 | Fan |
| 10,015,416 B2 | 7/2018 | Borthakur et al. |
| 10,419,701 B2 | 9/2019 | Liu |
| 10,574,925 B2 | 2/2020 | Otaka |
| 10,598,546 B2 | 3/2020 | Liu |
| 10,608,101 B2 | 3/2020 | Liu |
| 10,686,996 B2 | 6/2020 | Liu |
| 10,897,586 B2 | 1/2021 | Liu et al. |
| 10,917,589 B2 | 2/2021 | Liu |
| 10,951,849 B2 | 3/2021 | Liu |
| 2002/0067303 A1 | 6/2002 | Lee et al. |
| 2003/0020100 A1 | 1/2003 | Guidash |
| 2003/0049925 A1 | 3/2003 | Layman et al. |
| 2004/0095495 A1 | 5/2004 | Inokuma et al. |
| 2004/0118994 A1 | 6/2004 | Mizuno |
| 2004/0251483 A1 | 12/2004 | Ko et al. |
| 2005/0057389 A1 | 3/2005 | Krymski |
| 2005/0104983 A1 | 5/2005 | Raynor |
| 2005/0280727 A1 | 12/2005 | Sato et al. |
| 2006/0023109 A1 | 2/2006 | Mabuchi et al. |
| 2006/0158541 A1 | 7/2006 | Ichikawa |
| 2007/0013983 A1 | 1/2007 | Kitamura et al. |
| 2007/0076481 A1 | 4/2007 | Tennant |
| 2007/0092244 A1 | 4/2007 | Pertsel et al. |
| 2007/0102740 A1 | 5/2007 | Ellis-Monaghan et al. |
| 2007/0131991 A1 | 6/2007 | Sugawa |
| 2007/0208526 A1 | 9/2007 | Staudt et al. |
| 2007/0222881 A1 | 9/2007 | Mentzer |
| 2008/0001065 A1 | 1/2008 | Ackland |
| 2008/0068478 A1 | 3/2008 | Watanabe |
| 2008/0088014 A1 | 4/2008 | Adkisson et al. |
| 2008/0191791 A1 | 8/2008 | Nomura et al. |
| 2008/0226183 A1 | 9/2008 | Lei et al. |
| 2009/0002528 A1 | 1/2009 | Manabe et al. |
| 2009/0091645 A1 | 4/2009 | Trimeche et al. |
| 2009/0128640 A1 | 5/2009 | Yumiki |
| 2009/0224139 A1 | 9/2009 | Buettgen et al. |
| 2009/0261235 A1 | 10/2009 | Lahav et al. |
| 2010/0013969 A1 | 1/2010 | Ui |
| 2010/0140732 A1 | 6/2010 | Eminoglu et al. |
| 2010/0232227 A1 | 9/2010 | Lee |
| 2010/0276572 A1 | 11/2010 | Iwabuchi et al. |
| 2011/0049589 A1 | 3/2011 | Chuang et al. |
| 2011/0122304 A1 | 5/2011 | Sedelnikov |
| 2011/0149116 A1 | 6/2011 | Kim |
| 2011/0254986 A1 | 10/2011 | Nishimura et al. |
| 2012/0039548 A1 | 2/2012 | Wang et al. |
| 2012/0068051 A1 | 3/2012 | Ahn et al. |
| 2012/0092677 A1 | 4/2012 | Suehira et al. |
| 2012/0127084 A1 | 5/2012 | Bar-Zeev et al. |
| 2012/0133807 A1 | 5/2012 | Wu et al. |
| 2012/0138775 A1 | 6/2012 | Cheon et al. |
| 2012/0153123 A1 | 6/2012 | Mao et al. |
| 2012/0188420 A1 | 7/2012 | Black et al. |
| 2012/0241591 A1 | 9/2012 | Wan et al. |
| 2012/0262616 A1 | 10/2012 | Sa et al. |
| 2012/0267511 A1 | 10/2012 | Kozlowski |
| 2012/0273654 A1 | 11/2012 | Hynecek et al. |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0082313 A1 | 4/2013 | Manabe |
| 2013/0113969 A1 | 5/2013 | Manabe et al. |
| 2013/0126710 A1 | 5/2013 | Kondo |
| 2013/0141619 A1 | 6/2013 | Lim et al. |
| 2013/0207219 A1 | 8/2013 | Ahn |
| 2013/0214371 A1 | 8/2013 | Asatsuma et al. |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0293752 A1 | 11/2013 | Peng et al. |
| 2013/0299674 A1 | 11/2013 | Fowler et al. |
| 2014/0021574 A1 | 1/2014 | Egawa |
| 2014/0042299 A1 | 2/2014 | Wan et al. |
| 2014/0042582 A1 | 2/2014 | Kondo |
| 2014/0085523 A1 | 3/2014 | Hynecek |
| 2014/0176770 A1 | 6/2014 | Kondo |
| 2014/0211052 A1 | 7/2014 | Choi |
| 2014/0232890 A1 | 8/2014 | Yoo et al. |
| 2014/0306276 A1 | 10/2014 | Yamaguchi |
| 2015/0083895 A1 | 3/2015 | Hashimoto et al. |
| 2015/0090863 A1 | 4/2015 | Mansoorian et al. |
| 2015/0172574 A1 | 6/2015 | Honda et al. |
| 2015/0189209 A1 | 7/2015 | Yang et al. |
| 2015/0208009 A1 | 7/2015 | Oh et al. |
| 2015/0229859 A1 | 8/2015 | Guidash et al. |
| 2015/0237274 A1 | 8/2015 | Yang et al. |
| 2015/0279884 A1 | 10/2015 | Kusumoto |
| 2015/0287766 A1 | 10/2015 | Kim et al. |
| 2015/0312502 A1 | 10/2015 | Borremans |
| 2015/0350582 A1 | 12/2015 | Korobov et al. |
| 2015/0358569 A1 | 12/2015 | Egawa |
| 2015/0358593 A1 | 12/2015 | Sato |
| 2015/0381907 A1 | 12/2015 | Boettiger et al. |
| 2016/0028974 A1 | 1/2016 | Guidash et al. |
| 2016/0028980 A1 | 1/2016 | Kameyama et al. |
| 2016/0037111 A1 | 2/2016 | Dai et al. |
| 2016/0088253 A1 | 3/2016 | Tezuka |
| 2016/0100115 A1 | 4/2016 | Kusano |
| 2016/0111457 A1 | 4/2016 | Sekine |
| 2016/0112626 A1 | 4/2016 | Shimada |
| 2016/0118992 A1 | 4/2016 | Milkov |
| 2016/0165160 A1 | 6/2016 | Hseih et al. |
| 2016/0204150 A1 | 7/2016 | Oh et al. |
| 2016/0240570 A1 | 8/2016 | Barna et al. |
| 2016/0249004 A1 | 8/2016 | Saeki et al. |
| 2016/0307945 A1 | 10/2016 | Madurawe |
| 2016/0337605 A1 | 11/2016 | Ito |
| 2016/0353045 A1 | 12/2016 | Kawahito et al. |
| 2016/0360127 A1 | 12/2016 | Dierickx et al. |
| 2017/0013215 A1 | 1/2017 | McCarten |
| 2017/0053962 A1 | 2/2017 | Oh et al. |
| 2017/0062501 A1 | 3/2017 | Velichko et al. |
| 2017/0069363 A1 | 3/2017 | Baker |
| 2017/0099422 A1* | 4/2017 | Goma .................. H04N 5/378 |
| 2017/0099446 A1 | 4/2017 | Cremers et al. |
| 2017/0104021 A1 | 4/2017 | Park et al. |
| 2017/0104946 A1 | 4/2017 | Hong |
| 2017/0111600 A1 | 4/2017 | Wang et al. |
| 2017/0141147 A1 | 5/2017 | Raynor |
| 2017/0170223 A1 | 6/2017 | Hynecek et al. |
| 2017/0207268 A1 | 7/2017 | Kurokawa |

(56) References Cited

U.S. PATENT DOCUMENTS

| | | |
|---|---|---|
| 2017/0346579 A1 | 11/2017 | Barghi |
| 2017/0359497 A1 | 12/2017 | Mandelli et al. |
| 2017/0366766 A1 | 12/2017 | Geurts et al. |
| 2018/0019269 A1 | 1/2018 | Klipstein |
| 2018/0077368 A1 | 3/2018 | Suzuki |
| 2018/0152650 A1 | 5/2018 | Sakakibara et al. |
| 2018/0220093 A1 | 8/2018 | Murao et al. |
| 2018/0376046 A1 | 12/2018 | Liu |
| 2019/0052788 A1 | 2/2019 | Liu |
| 2019/0056264 A1 | 2/2019 | Liu |
| 2019/0057995 A1 | 2/2019 | Liu |
| 2019/0058058 A1 | 2/2019 | Liu |
| 2019/0104263 A1 | 4/2019 | Ochiai et al. |
| 2019/0104265 A1 | 4/2019 | Totsuka et al. |
| 2019/0141270 A1 | 5/2019 | Otaka et al. |
| 2019/0157330 A1 | 5/2019 | Sato et al. |
| 2019/0172868 A1 | 6/2019 | Chen et al. |
| 2019/0335151 A1 | 10/2019 | Rivard et al. |
| 2019/0348460 A1 | 11/2019 | Chen et al. |
| 2019/0355782 A1 | 11/2019 | Do et al. |
| 2019/0379827 A1 | 12/2019 | Berkovich et al. |
| 2020/0007800 A1 | 1/2020 | Berkovich et al. |
| 2020/0068189 A1 | 2/2020 | Chen et al. |
| 2020/0374475 A1 | 11/2020 | Fukuoka et al. |
| 2021/0099659 A1 | 4/2021 | Miyauchi et al. |

FOREIGN PATENT DOCUMENTS

| | | |
|---|---|---|
| EP | 1681856 | 7/2006 |
| EP | 1732134 | 12/2006 |
| EP | 1746820 | 1/2007 |
| EP | 2063630 | 5/2009 |
| EP | 2538664 | 12/2012 |
| EP | 2833619 | 2/2015 |
| EP | 3032822 | 6/2016 |
| EP | 3258683 | 12/2017 |
| EP | 3425352 | 1/2019 |
| KR | 100574959 | 4/2006 |
| KR | 20110050351 | 5/2011 |
| KR | 20150095841 | 8/2015 |
| KR | 20160008287 | 1/2016 |
| WO | 2017058488 | 4/2017 |
| WO | 2017069706 | 4/2017 |
| WO | 2017169882 | 10/2017 |
| WO | 2019168929 | 9/2019 |

OTHER PUBLICATIONS

U.S. Appl. No. 15/668,241, Final Office Action, dated Jun. 17, 2019, 19 pages.
U.S. Appl. No. 15/668,241, Non-Final Office Action, dated Dec. 21, 2018, 3 pages.
U.S. Appl. No. 15/668,241, Notice of Allowance, dated Jun. 29, 2020, 8 pages.
U.S. Appl. No. 15/668,241, Notice of Allowance, dated Mar. 5, 2020, 8 pages.
U.S. Appl. No. 15/668,241, "Supplemental Notice of Allowability", dated Apr. 29, 2020, 5 pages.
U.S. Appl. No. 15/719,345, Final Office Action, dated Apr. 29, 2020, 14 pages.
U.S. Appl. No. 15/719,345, Non- Final Office Action, dated Nov. 25, 2019, 14 pages.
U.S. Appl. No. 15/719,345, Notice of Allowance, dated Aug. 12, 2020, 11 pages.
U.S. Appl. No. 15/719,345, Notice of Allowance, dated Sep. 3, 2020, 12 pages.
U.S. Appl. No. 15/801,216, Advisory Action, dated Apr. 7, 2020, 3 pages.
U.S. Appl. No. 15/801,216, Final Office Action, dated Dec. 26, 2019, 5 pages.
U.S. Appl. No. 15/801,216, Non-Final Office Action, dated Jun. 27, 2019, 13 pages.
U.S. Appl. No. 15/801,216, Notice of Allowance, dated Jun. 23, 2020, 5 pages.
U.S. Appl. No. 15/847,517, Non-Final Office Action, dated Nov. 23, 2018, 21 pages.
U.S. Appl. No. 15/847,517, Notice of Allowance, dated May 1, 2019, 11 pages.
U.S. Appl. No. 15/861,588, Non-Final Office Action, dated Jul. 10, 2019, 11 pages.
U.S. Appl. No. 15/861,588, Notice of Allowance, dated Nov. 26, 2019, 9 pages.
U.S. Appl. No. 15/876,061, "Corrected Notice of Allowability", dated Apr. 28, 2020, 3 pages.
U.S. Appl. No. 15/876,061, Non-Final Office Action, dated Sep. 18, 2019, 23 pages.
U.S. Appl. No. 15/876,061, "Notice of Allowability", May 6, 2020, 2 pages.
U.S. Appl. No. 15/876,061, Notice of Allowance, dated Feb. 4, 2020, 13 pages.
U.S. Appl. No. 15/927,896, Non-Final Office Action, dated May 1, 2019, 10 pages.
U.S. Appl. No. 15/983,379, Notice of Allowance, dated Oct. 18, 2019, 9 pages.
U.S. Appl. No. 15/983,391, Non-Final Office Action, dated Aug. 29, 2019, 12 pages.
U.S. Appl. No. 15/983,391, Notice of Allowance, dated Apr. 8, 2020, 8 pages.
U.S. Appl. No. 16/177,971, Final Office Action, dated Feb. 27, 2020, 9 pages.
U.S. Appl. No. 16/177,971, Non-Final Office Action, dated Sep. 25, 2019, 9 pages.
U.S. Appl. No. 16/177,971, Notice of Allowance, dated Apr. 24, 2020, 6 pages.
U.S. Appl. No. 16/210,748, Final Office Action, dated Jul. 7, 2020, 11 pages.
U.S. Appl. No. 16/210,748, Non-Final Office Action, dated Jan. 31, 2020, 11 pages.
U.S. Appl. No. 16/249,420, Non-Final Office Action, dated Jul. 22, 2020, 9 pages.
U.S. Appl. No. 16/286,355, Non-Final Office Action, dated Oct. 1, 2019, 6 pages.
U.S. Appl. No. 16/286,355, Notice of Allowance, dated Feb. 12, 2020, 7 pages.
U.S. Appl. No. 16/286,355, Notice of Allowance, dated Jun. 4, 2020, 7 pages.
U.S. Appl. No. 16/369,763, Non-Final Office Action, dated Jul. 22, 2020, 15 pages.
U.S. Appl. No. 16/382,015, Notice of Allowance, dated Jun. 11, 2020, 11 pages.
U.S. Appl. No. 16/384,720, Non-Final Office Action, dated May 1, 2020, 6 pages.
U.S. Appl. No. 16/431,693, Non-Final Office Action, dated Jan. 30, 2020, 6 pages.
U.S. Appl. No. 16/431,693, Notice of Allowance, dated Jun. 24, 2020, 7 pages.
U.S. Appl. No. 16/435,449, Notice of Allowance, dated Jul. 27, 2020, 8 pages.
U.S. Appl. No. 16/436,049, Non-Final Office Action, dated Jun. 30, 2020, 11 pages.
U.S. Appl. No. 16/436,049, Non-Final Office Action, dated Mar. 4, 2020, 9 pages.
U.S. Appl. No. 16/454,787, Notice of Allowance, dated Apr. 22, 2020, 10 pages.
U.S. Appl. No. 16/454,787, Notice of Allowance, dated Jul. 9, 2020, 9 pages.
U.S. Appl. No. 16/566,583, Final Office Action, dated Apr. 15, 2020, 24 pages.
U.S. Appl. No. 16/566,583, Non-Final Office Action, dated Oct. 1, 2019, 10 pages.
U.S. Appl. No. 16/566,583, Non-Final Office Action, dated Jul. 27, 2020, 11 pages.
Cho et al., "A Low Power Dual CDS for a Column-Parallel CMOS Image Sensor", Journal of Semiconductor Technology and Science, vol. 12, No. 4, Dec. 30, 2012, pp. 388-396.

(56) References Cited

OTHER PUBLICATIONS

Application No. EP18179838.0, Extended European Search Report, dated May 24, 2019, 17 pages.
EP18179838.0, "Partial European Search Report", dated Dec. 5, 2018, 14 pages.
Application No. EP18179846.3, Extended European Search Report, dated Dec. 7, 2018, 10 pages.
Application No. EP18179851.3, Extended European Search Report, dated Dec. 7, 2018, 8 pages.
Application No. EP18188684.7, Extended European Search Report, dated Jan. 16, 2019, 10 pages.
Application No. EP18188684.7, Office Action, dated Nov. 26, 2019, 9 pages.
Application No. EP18188962.7, Extended European Search Report, dated Oct. 23, 2018, 8 pages.
Application No. EP18188962.7, Office Action, dated Aug. 28, 2019, 6 pages.
Application No. EP18188968.4, Extended European Search Report, dated Oct. 23, 2018, 8 pages.
Application No. EP18188968.4, Office Action, dated Aug. 14, 2019, 5 pages.
Application No. EP18189100.3, Extended European Search Report, dated Oct. 9, 2018, 8 pages.
Kavusi et al., "Quantitative Study of High-Dynamic-Range Image Sensor Architectures", Proceedings of Society of Photo-Optical Instrumentation Engineers—The International Society for Optical Engineering, vol. 5301, Jun. 2004, pp. 264-275.
Application No. PCT/US2018/039350, International Preliminary Report on Patentability, dated Jan. 9, 2020, 10 pages.
Application No. PCT/US2018/039350, International Search Report and Written Opinion, dated Nov. 15, 2018, 13 pages.
Application No. PCT/US2018/039352, International Search Report and Written Opinion, dated Oct. 26, 2018, 10 pages.
Application No. PCT/US2018/039431, International Search Report and Written Opinion, dated Nov. 7, 2018, 14 pages.
Application No. PCT/US2018/045661, International Search Report and Written Opinion, dated Nov. 30, 2018, 11 Pages.
Application No. PCT/US2018/045666, International Preliminary Report on Patentability, dated Feb. 27, 2020, 11 pages.
Application No. PCT/US2018/045666, International Search Report and Written Opinion, dated Dec. 3, 2018, 13 pages.
Application No. PCT/US2018/045673, International Search Report and Written Opinion, dated Dec. 4, 2018, 13 pages.
Application No. PCT/US2018/046131, International Search Report and Written Opinion, dated Dec. 3, 2018, 10 pages.
Application No. PCT/US2018/064181, International Preliminary Report on Patentability, dated Jun. 18, 2020, 9 pages.
Application No. PCT/US2018/064181, International Search Report and Written Opinion, dated Mar. 29, 2019, 12 pages.
Application No. PCT/US2019/014044, International Search Report and Written Opinion, dated May 8, 2019, 11 pages.
Application No. PCT/US2019/019756, International Search Report and Written Opinion, dated Jun. 13, 2019, 11 pages.
Application No. PCT/US2019/025170, International Search Report and Written Opinion, dated Jul. 9, 2019, 11 pages.
Application No. PCT/US2019/027727, International Search Report and Written Opinion, dated Jun. 27, 2019, 11 pages.
Application No. PCT/US2019/027729, International Search Report and Written Opinion, dated Jun. 27, 2019, 10 pages.
Application No. PCT/US2019/031521, International Search Report and Written Opinion, dated Jul. 11, 2019, 11 pages.
Application No. PCT/US2019/035724, International Search Report and Written Opinion, dated Sep. 10, 2019, 12 pages.
Application No. PCT/US2019/036484, International Search Report and Written Opinion, dated Sep. 19, 2019, 10 pages.
Application No. PCT/US2019/036492, International Search Report and Written Opinion, dated Sep. 25, 2019, 9 pages.
Application No. PCT/US2019/036536, International Search Report and Written Opinion, dated Sep. 26, 2019, 14 pages.
Application No. PCT/US2019/036575, International Search Report and Written Opinion, dated Sep. 30, 2019, 16 pages.
Application No. PCT/US2019/039410, International Search Report and Written Opinion, dated Sep. 30, 2019, 11 pages.
Application No. PCT/US2019/039758, International Search Report and Written Opinion, dated Oct. 11, 2019, 13 pages.
Application No. PCT/US2019/047156, International Search Report and Written Opinion, dated Oct. 23, 2019, 9 pages.
Application No. PCT/US2019/048241, International Search Report and Written Opinion, dated Jan. 28, 2020, 16 pages.
Application No. PCT/US2019/049756, International Search Report and Written Opinion, dated Dec. 16, 2019, 8 pages.
Application No. PCT/US2019/059754, International Search Report and Written Opinion, dated Mar. 24, 2020, 15 pages.
Application No. PCT/US2019/065430, International Search Report and Written Opinion, dated Mar. 6, 2020, 15 pages.
Snoeij , "A Low Power Column-Parallel 12-Bit ADC for CMOS Imagers", Institute of Electrical and Electronics Engineers Workshop on Charge-Coupled Devices and Advanced Image Sensors, Jun. 2005, pp. 169-172.
Tanner et al., "Low-Power Digital Image Sensor for Still Picture Image Acquisition", Visual Communications and Image Processing, vol. 4306, Jan. 22, 2001, 8 pages.
Xu et al., "A New Digital-Pixel Architecture for CMOS Image Sensor with Pixel-Level ADC and Pulse Width Modulation using a 0.18 Mu M CMOS Technology", Institute of Electrical and Electronics Engineers Conference on Electron Devices and Solid-State Circuits, Dec. 16-18, 2003, pp. 265-268.
U.S. Appl. No. 16/454,787, "Notice of Allowance", dated Sep. 9, 2020, 9 pages.
U.S. Appl. No. 16/707,988, "Non-Final Office Action", dated Sep. 22, 2020, 15 pages.
U.S. Appl. No. 16/435,451, "Non-Final Office Action", dated Feb. 1, 2021, 14 pages.
U.S. Appl. No. 16/566,583, "Corrected Notice of Allowability", dated Feb. 3, 2021, 2 pages.
U.S. Appl. No. 16/896,130, "Non-Final Office Action", dated Mar. 15, 2021, 16 pages.
U.S. Appl. No. 16/707,988, "Notice of Allowance", dated May 5, 2021, 14 pages.
Non-Final Office Action for U.S. Appl. No. 17/072,840, dated Jun. 8, 2021, 7 pages.

\* cited by examiner

CONFIGURABLE IMAGE SENSOR

RELATED APPLICATION

This patent application claims priority to U.S. Provisional Patent Application Ser. No. 62/683,563, filed Jun. 11, 2018, entitled "SINGLE FRAME, MULTIPLE SAMPLING WITH MULTI-MODE DIGITAL PIXEL SENSOR," which is assigned to the assignee hereof and is incorporated herein by reference in its entirety for all purposes.

BACKGROUND

The disclosure relates generally to image sensors, and more specifically to pixel cell structure including interfacing circuitries for determining light intensity for image generation.

A typical image sensor includes a photodiode to sense incident light by converting photons into charge (e.g., electrons or holes). The image sensor further includes a charge storage unit to converting the charge generated by the photodiode to a voltage. The voltage can be quantized by an analog-to-digital converter (ADC) into a digital value to represent the intensity of the incident light. The correlation between the voltage and incident light intensity, however, can be degraded by various sources, such as noise, saturation of the charge storage unit, etc., all of which can reduce the dynamic range of the image sensor.

SUMMARY

The present disclosure relates to image sensors. More specifically, and without limitation, this disclosure relates to a pixel cell.

The present disclosure provides an apparatus for measuring an intensity of incident light. In one example, the apparatus comprises: a photodiode, a charge storage unit including a floating drain, a quantizer, and a controller. The controller is configured to: receive programming data; determine, based on the programming data, at least one of: an integration period in which the charge storage unit including a floating drain accumulates charge received from the photodiode, or a number of times of sampling the charge received from the photodiode; enable the photodiode to accumulate residual charge, and to transmit overflow charge to the charge storage unit after the photodiode saturates; and control the charge storage unit to accumulate at least a part of the overflow charge received from the photodiode within the integration period. The controller can also control the quantizer to: sample the at least a part of the overflow charge or the residual charge for the number of times to obtain the number of samples, and quantize the number of samples to generate the number of quantization results.

In some aspects, the controller is configured to: at a first time, enable the photodiode to start accumulating the residual charge; release the charge storage unit from a reset state starting at a second time after the first time; and reset the charge storage unit at a third time after the second time. The controller is configured set the at least one of the second time or the third time based on the programming data.

In some aspects, the integration period is a first integration period and starts at the second time. A second integration period of the photodiode starts at the first time.

In some aspects, the apparatus further comprises a shutter switch coupled between the photodiode and a first charge sink and a reset switch coupled between the charge storage unit and a second charge sink.

In some aspects, the controller is configured to: at the first time, disable the shutter switch to start the second integration period; at the second time, disable the reset switch to start the first integration period; and at the third time, enable the reset switch to stop the first integration period.

In some aspects, the apparatus further comprises a transfer switch coupled between the photodiode and the charge storage unit, the transfer switch comprising a gate and the floating drain region of the charge storage unit. The controller is configured to, within the first integration period and the second integration period, transmit a first control signal to a gate of the transfer switch to enable the photodiode to store the residual charge; and within the first integration period, control the quantizer to quantize a first number of samples of the at least a part of the overflow charge accumulated at the charge storage unit.

In some aspects, the controller is configured to, after the third time: disable the reset switch; transmit a second control signal to the gate of the transfer switch to transfer the residual charge from the photodiode to the charge storage unit; enable the shutter switch to stop both the first integration period and the second integration period; and after the first integration period and the second integration period end, control the quantizer to quantize the residual charge accumulated at the charge storage unit.

In some aspects, the quantizer comprises a comparator, a counter, and a memory. The controller is configured to perform a quantization operation comprising: controlling the counter to start counting from a start count value; controlling the comparator to compare a voltage at the charge storage unit with one or more thresholds to generate a comparison result; and based on the comparison result, controlling the memory to store a count value from the counter as a quantization result of a sample of the voltage.

In some aspects, the controller is configured to perform the number of the quantization operations based on the programming data to generate the number of the quantization results.

In some aspects, the controller is configured to, in each of the number of quantization operations, control the comparator to compare the voltage with a ramping threshold to determine a quantity of the overflow charge or a quantity of the residual charge stored at the charge storage unit.

In some aspects, the controller is configured to generate an output representing an intensity of incident light received by the photodiode based on a rate of change among the number of quantization results.

In some aspects, the controller is configured to: determine a first rate of change among a first subset of the number of quantization results; determine a second rate of change among a second subset of the number of quantization results; and based on a relationship between the first rate of change and the second rate of change, generate the output based on the first rate of change.

In some aspects, the controller is configured to: based on the relationship, determine that the charge storage unit is saturated when the samples of the voltage represented by the second subset of the number of quantization results are obtained; and based on the determination the charge storage unit is saturated, generate the output based on the first rate of change.

In some aspects, the controller is configured to: in each of the number of quantization operations, reset the charge storage unit; and generate an output representing an intensity of incident light received by the photodiode based on an average of the number of quantization results.

In some aspects, the controller is configured to, in each of the number of quantization operations, control the comparator to compare the voltage with a static threshold. Each of the number of quantization results represent a time for the charge storage unit to become saturated by the overflow charge.

In some aspects, the controller is configured to perform the number of quantization operations within the first integration period to quantize the at least a part of the overflow charge.

In some aspects, the controller is configured to perform the number of quantization operations within the second integration period to quantize the residual charge.

In one example, a method comprises: receiving programming data; determining, based on the programming data, at least one of: an integration period in which a charge storage unit including a floating drain accumulates charge received from a photodiode, or a number of times of sampling the charge; enabling the photodiode to accumulate residual charge, and to transmit overflow charge to the charge storage unit after the photodiode saturates; controlling the charge storage unit to accumulate at least a part of the overflow charge received from the photodiode within the integration period; controlling a quantizer to sample the at least a part of the overflow charge or the residual charge for the number of times to obtain the number of samples; and controlling the quantizer to quantize the number of samples to generate the number of quantization results.

In some aspects, the method further comprises: at a first time, enabling the photodiode to start accumulating the overflow charge; starting at a second time after the first time, releasing the charge storage unit from a reset state; and resetting the charge storage unit at a third time after the second time. The duration of the integration period is set based on at least one of the second time or the third time.

In some aspects, the method further comprises performing the number of quantization processes, each of the quantization processes comprising: controlling the counter to start counting from a start count value; controlling the comparator to compare a voltage at the charge storage unit with one or more thresholds to generate a comparison result; and based on the comparison result, controlling the memory to store a count value from the counter as a quantization result of a sample of the voltage.

BRIEF DESCRIPTION OF THE DRAWINGS

Illustrative examples are described with reference to the following figures.

Figure 1A:
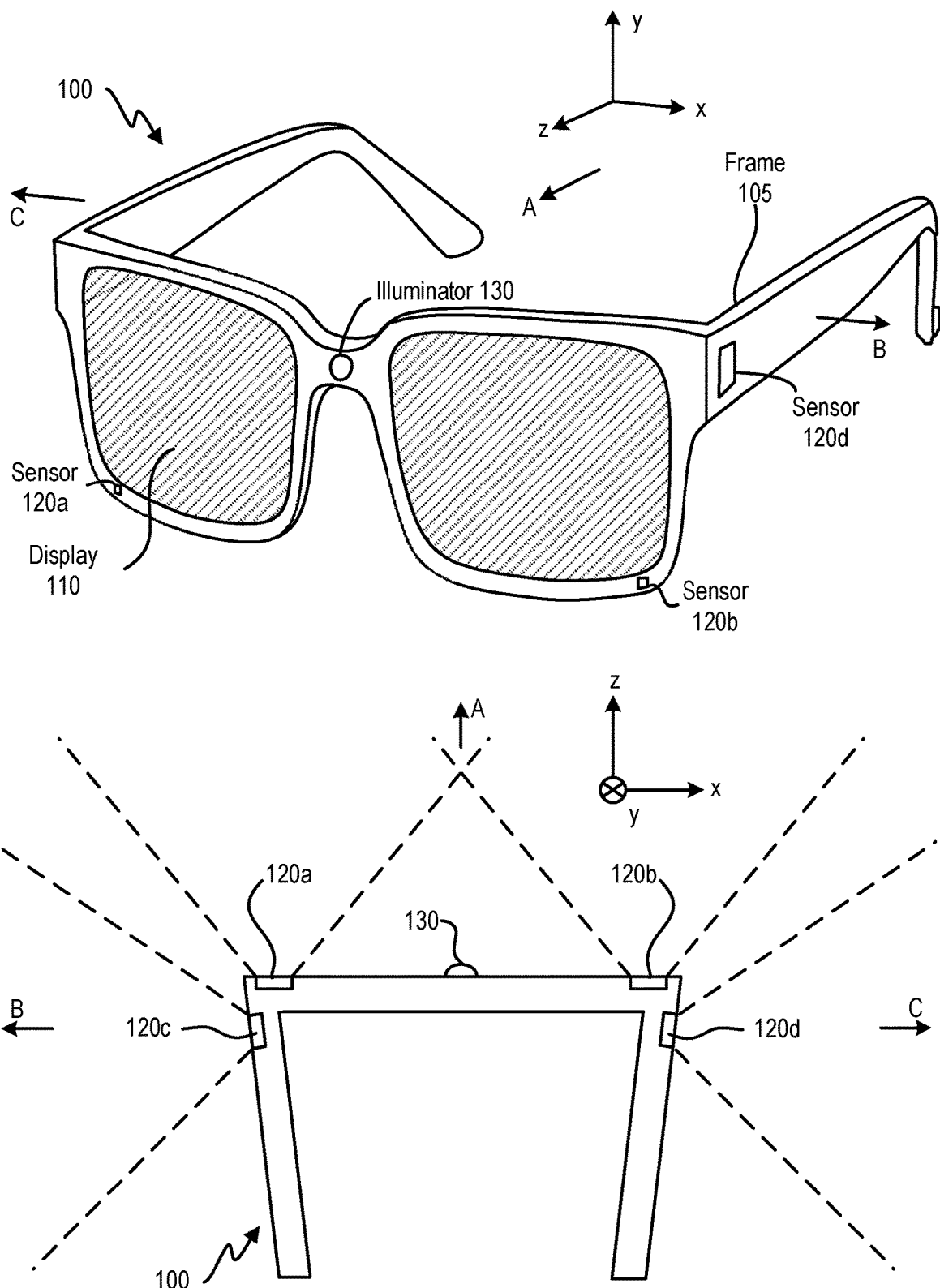
FIG. 1A and FIG. 1B are diagrams of an example of a near-eye display.

The figures depict examples of the present disclosure for purposes of illustration only. One skilled in the art will readily recognize from the following description that alternative examples of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive examples. However, it will be apparent that various examples may be practiced without these specific details. The figures and description are not intended to be restrictive.

A typical image sensor includes a photodiode to sense incident light by converting photons into charge (e.g., electrons or holes). The image sensor further includes a floating node configured as a capacitor to collect the charge generated by the photodiode during an integration period. The collected charge can develop a voltage at the capacitor. The voltage can be buffered and fed to an analog-to-digital converter (ADC), which can convert the voltage into a digital value representing the intensity of the incident light.

The digital value generated by the ADC, which reflects a quantity of charge stored at the floating node within a certain period, may correlate to the intensity of the incident light. However, the degree of correlation can be affected by different factors. First, the quantity of charge stored in the floating node can be directly related to the intensity of the incident light until the floating node reaches a saturation limit. Beyond the saturation limit, the floating node may be unable to accept additional charge generated by the photodiode, and the additional charge may be leaked and not stored. As a result, the quantity of the charge stored at the floating node may be lower than the quantity of charge actually generated by the photodiode. The saturation limit may determine an upper limit of the measureable light intensity of the image sensor.

Various factors can also set a lower limit of the measureable light intensity of the image sensor. For example, the charge collected at the floating node may include noise charge not related to the intensity of incident light, as well as dark charge contributed by dark current. Dark current can include leakage currents generated at the p-n junction of the photodiode and at the p-n junctions of other semiconductor devices connected to the capacitor, due to crystallographic defects. The dark currents can flow into the capacitor and add charges which are not correlated to the intensity of the incident light. The dark current generated at the photodiode is typically less than the dark current generated at other semiconductor devices. Another source of noise charge can be capacitive coupling with other circuitries. For example, when the ADC circuitries perform read operations to determine the quantity of charge stored in the floating node, the ADC circuitries can introduce noise charge into the floating node through capacitive coupling.

Besides noise charge, the ADC can also introduce measurement errors in determining the quantity of charge. The measurement errors can degrade the degree of correlation between the digital output and the intensity of the incident light. One source of measurement error is quantization error. In a quantization process, a discrete set of quantity levels can be used to represent a continuous set of quantities of charge, with each quantity level representing a pre-determined quantity of charge. The ADC can compare an input quantity of charge against the quantity levels, determine the quantity level that is closest to the input quantity, and output the determined quantity level (e.g., in the form of digital codes representing the quantity level). Quantization error can occur when there is a mismatch between a quantity of charge represented by the quantity level and the input quantity of charge mapped to the quantity level. The quantization error can be reduced with smaller quantization step sizes (e.g., by reducing the difference in charge quantities between two adjacent quantity levels). Other sources of measurement error may also include, for example, device noises (e.g., of the ADC circuitries) and comparator offsets that add to uncertainties in the measurement of the quantity of charge. The noise charge, dark charge, as well as the ADC measurement errors, can define a lower limit of the measureable light intensity of the image sensor, whereas the saturation limit may determine an upper limit of the measureable light intensity of the image sensor. A ratio between the upper limit and the lower limit defines a dynamic range, which may set a range of operational light intensities for the image sensor.

Image sensors can be found in many different applications. As an example, image sensors are included in digital imaging devices (e.g., digital cameras, smart phones, etc.) to provide digital imaging. As another example, image sensors can be configured as input devices to control or influence the operation of a device, such as controlling or influencing the display content of a near-eye display in wearable virtual-reality (VR) systems and/or augmented-reality (AR) and/or mixed reality (MR) systems. For example, the image sensors can be used to generate physical image data of a physical environment in which a user is located. The physical image data can be provided to a location tracking system operating a simultaneous localization and mapping (SLAM) algorithm to track, for example, a location of the user, an orientation of the user, and/or a path of movement of the user in the physical environment. The image sensors can also be used to generate physical image data including stereo depth information for measuring a distance between the user and an object in the physical environment. The image sensors can also be configured as a near-infrared (NIR) sensor. An illuminator may project a pattern of NIR light into the eyeballs of the user. The internal structures of the eyeballs (e.g., the pupils) may generate a reflective pattern from the NIR light. The image sensors can capture images of the reflective pattern, and provide the images to a system to track the movement of the eyeballs of the user to determine a gaze point of the user. Based on this physical image data, the VR/AR/MR system may generate and update virtual image data for displaying to the user via the near-eye display, to provide an interactive experience to the user. For example, the VR/AR/MR system may update the virtual image data based on the user's gazing direction (which may signal the user's interest in the object), a location of the user, etc.

A wearable VR/AR/MR system may operate in environments with a very wide range of light intensities. For example, the wearable VR/AR/MR system may be able to operate in an indoor environment or in an outdoor environment, and/or at different times of the day, and the light intensity of the operation environment of the wearable VR/AR/MR system may vary substantially. Moreover, the wearable VR/AR/MR system may also include the aforementioned NIR eyeball tracking system, which may require projecting lights of very low intensity into the eyeballs of the user to prevent damaging the eyeballs. As a result, the image sensors of the wearable VR/AR/MR system may need to have a wide dynamic range to be able to operate properly (e.g., to generate an output that correlates with the intensity of incident light) across a very wide range of light intensities associated with different operating environments. The image sensors of the wearable VR/AR/MR system may also need to generate images at sufficiently high speed to allow tracking of the user's location, orientation, gaze point, etc.

An image sensor that provides a fixed dynamic range and generates image data at a high speed typically requires a very high power, which makes such an image sensor unsuitable for a wearable device which typically operates at a very low power. Moreover, the image sensor may use only a small portion of the available dynamic range, but may use different portions of the available dynamic ranges for different applications. For example, an application that tracks eyeballs may require the sensor to detect high intensity light reflected by the cornea of the eye, as well as low intensity light reflected by the pupil, but not light with a medium intensity in between. As another example, an array of image sensors may receive light from different spots of a scene, and different image sensor within the array may receive light of vastly different intensities. A one-size-fit-all approach can be to provide an image sensor having a very wide dynamic range to cover the target intensity ranges for all these application, but such an approach not only requires a very high power but also leads to substantial waste of the power, as the wide dynamic range of the image sensor is rarely fully utilized in each of these applications.

This disclosure relates to a configurable pixel cell that can provide an extended dynamic range. The pixel cell may include a photodiode, a charge storage unit, a transistor configured as a transfer gate between the photodiode and the charge storage unit, as well as a processing circuit, which includes a controller and a comparator. The pixel cell further includes a shutter switch and a reset switch, both of which can be controlled by the controller. The controller can control the shutter switch to set an integration period of the photodiode in which the photodiode is enabled to generate charge responsive to incident light and store at least some of the charge as residual charge until the photodiode saturates. The charge storage unit can be a floating drain of the transistor, a metal capacitor, a Metal-Oxide-Semiconductor (MOS) capacitor, or any combination thereof, and can be reset by the reset switch. The controller can control the reset switch to set an integration period of the charge storage unit in which the charge storage unit can accumulate overflow charge, which is charge transferred from the photodiode when the photodiode saturates and cannot store additional charge, to develop a first voltage. The controller can also control the transfer gate to transfer the residual charge from the photodiode to the charge storage unit to develop a second voltage. The first voltage and the second voltage can be quantized to measure an intensity of the incident light.

The processing circuit can perform multiple modes of measurement for different intensity ranges. In a first mode of measurement, the controller can control the comparator to comparing the first voltage against a first ramping threshold voltage to generate a first decision. When the first decision indicates that the first voltage crosses the first ramping threshold voltage, a first count value can be captured from a counter and stored in a memory. The first count value can represent a measurement of the time it takes for the first ramping threshold voltage to cross the first voltage, which can also represent a result of quantizing the overflow charge stored in the charge storage unit. The quantity of the overflow charge can be proportional to the intensity of the incident light. For the rest of the disclosure, the first mode of measurement may be referred to as "FD ADC" operation. The FD ADC operation can be targeted at incident light of a medium intensity range for which the photodiode is saturated by the residual charge, but the charge storage unit is not saturated by the overflow charge.

The controller can control the transfer gate to transfer the residual charge from the photodiode to the charge storage unit to develop the second voltage for a second mode of measurement. In the second mode of measurement, the controller can control the comparator to compare the second voltage against a second ramping threshold voltage to generate a second decision. When the second decision indicates that the second voltage crosses the second ramping reference voltage, a second count value can be captured from the counter and stored in the memory. The second count value can represent a measurement of the time it takes for the second ramping threshold voltage to cross the second voltage, which also represents a result of quantizing the residual charge stored in the charge storage unit. The quantity of the residual charge can be proportional to the intensity of the incident light. For the rest of the disclosure, the second mode of measurement may be referred to as "PD ADC" operation. The PD ADC operation can target incident light of a low intensity range for which the photodiode is not saturated by the residual charge.

In some examples, the processing circuit can also perform a third mode of measurement. In the third mode of measurement, the controller can control the comparator to compare the first voltage with a static threshold voltage representing a saturation limit of the charge storage unit to generate a third decision. When the third decision indicates that the charge storage unit reaches or exceeds the saturation limit, a third count value can be captured from the counter and stored in the memory. The third count value can represent a measurement of the time it takes for the charge storage unit to become saturated, and the duration of time can be inversely proportional to the intensity of the incident light. For the rest of the disclosure, the third mode of measurement may be referred as time-to-saturation (TTS) operation. The TTS operation can target incident light of a high intensity range for which the photodiode is saturated by the overflow charge.

The controller can perform the different modes of measurements sequentially to generate an image frame. At the start of frame (SoF), the controller can release the shutter switch and the reset switch to start, respectively, the integration period of the photodiode and the integration period of the charge storage unit. The controller can also control the transfer gate to allow the photodiode to store residual charge. The integration period of the charge storage unit can start after the integration period of the photodiode starts. As the photodiode receives light, it can continue generating charge within the integration period of the photodiode and within the integration period of the charge storage unit. If and when the photodiode saturates, overflow charge can accumulate in the charge storage unit. After the integration period of the charge storage unit starts (when the reset switch is disabled), the controller can perform the TTS operation to determine whether the charge storage unit is saturated by the overflow charge, and to determine the time-to-saturation. The controller can then perform the FD ADC operation to determine a quantity of overflow charge stored in the charge storage unit. Following the end of the FD ADC operation, the controller can activate the reset switch to remove the overflow charge stored in the charge storage unit, which ends the integration period of the charge storage unit. The controller can then release the reset switch and control the transfer gate to transfer the residual charge from the photodiode to the charge storage unit, during which the photodiode may continue to generate additional charge. After the transfer of the residual charge ends, the controller can activate the shutter switch to end the integration period of the photodiode, and then perform the PD ADC operation to determine a quantity of residual charge stored in the charge storage unit. The end of the PD ADC operation can mark the end of frame (EoF). The time between the SoF and the EoF can correspond to a frame period, in which an image frame can be generated based on the output of one of TTS, FD ADC and PD ADC operations. The different modes of measurements can be repeated in subsequent frame periods to generate subsequent image frames.

The multi-mode measurement operations described above can extend the dynamic range of the light intensity measurement by a pixel cell. Specifically, the TTS measurement operation allows measurement of high light intensity beyond the intensity level that saturates the charge storage unit, which can extend the upper limit of the dynamic range. Moreover, the PD ADC operation measures residual charge stored in the photodiode for low light intensity. As the photodiode typically receives very little dark current, the magnitude of dark charge caused by dark current can remain small with respect to the real signal caused by the incident light, which can reduce the detectable incident light intensity and push down the lower limit of the dynamic range.

The pixel cell according to the present disclosure can also provide configurability for various aspects of the light intensity measurement operations, which allows the pixel cell to be optimized for different applications and to further extend the dynamic range. Specifically, in some examples, the duration of the TTS operation, the FD ADC operation, and/or the PD ADC operation is configurable. The duration of each measurement operation can set the target intensity range of the respective measurement operation. For example, for an application that requires the pixel cell to detect either light of very high intensity or light of very low intensity (e.g., an eye tracking operation), the controller can increase the frame period. The increased frame period allows increase in the photodiode integration period in which the photodiode generates and accumulates residual charge. Such arrangements can increase the time provided for conversion of photons of very low intensity light to charge, and more charge can be accumulated for very low intensity light as a result, which can increase the signal-to-noise ratio for low intensity light measurement and push down the lower limit of the dynamic range.

In addition, the duration of the second integration period in which the charge storage unit accumulates overflow charge can be reduced. Such arrangements can provide various benefits. First, the reduced second integration period can reduce the on-time of various analog components of the quantizer (e.g., the comparator), which can reduce the overall power consumption of the TTS operation and the FD ADC operation. Second, the reduced duration of the second integration period can also reduce the quantity of dark charge accumulated by the floating drain due to dark current, which can further improve the accuracy of the TTS and the FD ADC operations. The reduced second integration period also does not lower the upper limit of the dynamic range, as the charge storage unit can saturate within a very short duration when the pixel cell receives light of very high intensity, and the TTS operation can still provide an accurate representation of the light intensity.

The controller can adjust the second integration period based on various techniques. In one example, the controller can set the delay between the release of the reset switch (which resets the charge storage unit) with respect to the release of the shutter switch, prior to the TTS and FD ADC operation, to set a start time of the second integration period. In another example, the controller can set the delay between the activation of the reset switch and the activation of the shutter switch (prior to the PD ADC operation), to set an end time of the second integration period. In both examples, the controller can set the delays based on external programming data to set the duration of the second integration period.

In some examples, the number of TTS, PD ADC, and FD ADC measurement operations within a frame period is also configurable. Each TTS, PD ADC, and FD ADC measurement operation can generate a quantization result of a sample, and the measurement operations can be repeated within the integration period of the photodiode (e.g., multiple PD ADC operations) and/or within the integration period of the charge storage unit (multiple TTS operations, multiple FD ADC operations, etc.) to generate multiple quantization results of multiple samples. Each sample can include a voltage (for FD ADC and PD ADC operation) or a time-to-saturation (TTS). The controller can generate an intensity output for each measurement operation based on the multiple quantization results using various techniques.

In some examples, the sampled voltages can be based on continuous accumulation of overflow charge/residual charge at the charge storage unit from the photodiode across multiple FD ADC or PD ADC measurement operations. The controller can generate the intensity output based on a rate of change of the sampled voltages within a frame period and/or across multiple frame periods, with the rate of change reflecting a rate of accumulation of charge, which reflects the incident light intensity. Such arrangements of intensity measurement can provide numerous benefits. For example, the samples can be obtained and quantized at a high sampling frequency, which can reduce 1/f noise and improve the accuracy of the intensity measurement operation. Moreover, the intensity measurement can become more resilient to sources of mismatch like delays in the ramp or clock signal, which can either reduce or eliminate the need for calibration of these noise sources.

In addition, the controller can also determine whether there is a change in the rate of change of the sampled voltages to detect the saturation of the charge storage unit, and can determine the intensity output based on the rate of the change prior to the saturation. Such arrangements can expand the upper limit of the light intensity range for the FD ADC operation, which allows the TTS operation to be used for an even higher intensity range, and the upper limit of the overall dynamic range can be increased as a result.

In some examples, the charge storage unit can be reset prior to the sampling and quantization operation in each repeated TTS/FD ADC/PD ADC operation, to split the first/second integration periods into multiple integration periods. For example, the charge storage unit can be reset at the beginning of each TTS operation to obtain multiple sample count values representing multiple time-to-saturation measurements obtained in multiple integration periods. The charge storage unit can also be reset at the beginning of each FD ADC/PD ADC operation to obtain multiple sample voltages, each representing a quantity of accumulated charge in a shortened integration period. In both cases, the samples can be averaged to generate the intensity output. Such arrangements can reduce noise sources such as reset noise and quantization noise, which can improve the accuracy of the intensity measurement operation.

Examples of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some examples, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an example of a near-eye display 100. Near-eye display 100 presents media to a user. Examples of media presented by near-eye display 100 include one or more images, video, and/or audio. In some examples, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some examples, near-eye display 100 is modified to operate as an augmented reality (AR) display and/or a mixed reality (MR) display.

Near-eye display 100 includes a frame 105 and a display 110. Frame 105 is coupled to one or more optical elements.

Display 110 is configured for the user to see content presented by near-eye display 100. In some examples, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of view towards a direction A along the Z axis, whereas sensor 120c may be configured to provide image data representing a field of view towards a direction B along the X axis, and sensor 120d may be configured to provide image data representing a field of view towards a direction C along the X axis.

In some examples, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some examples, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such an arrangement, the accuracy and robustness of tracking a location of the user within the physical environment can be improved.

In some examples, near-eye display 100 may further include one or more active illuminators 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some examples, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
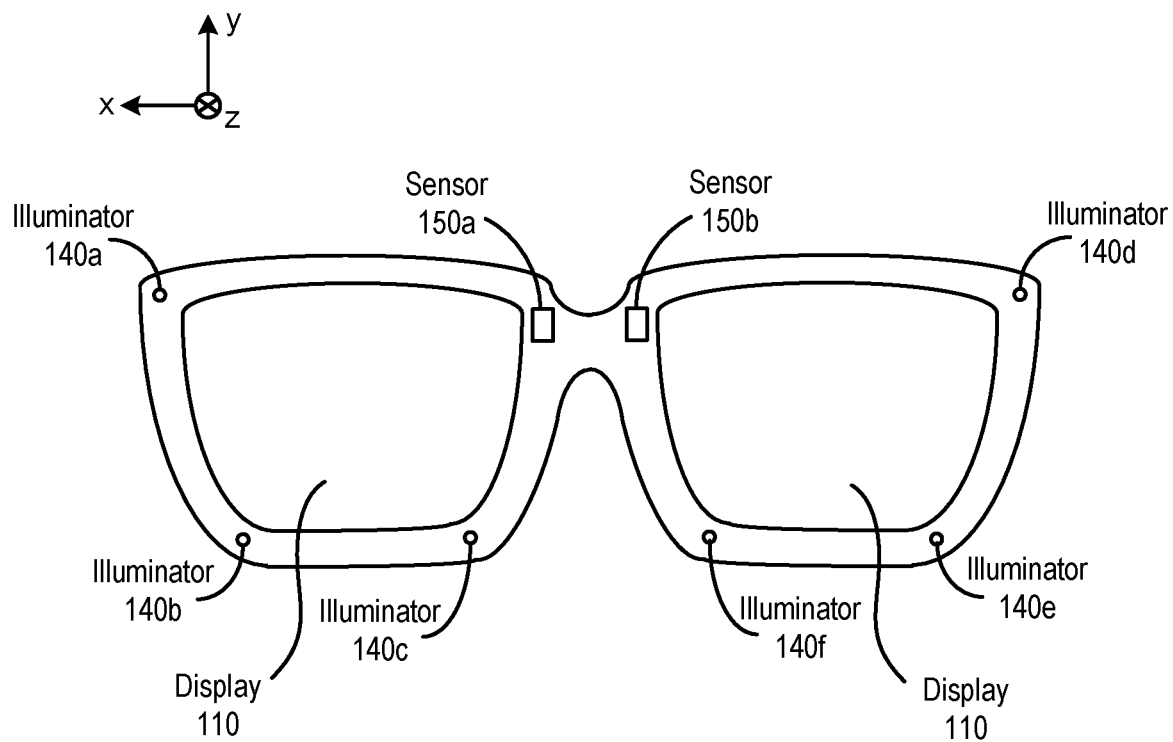

FIG. 1B is a diagram of another example of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
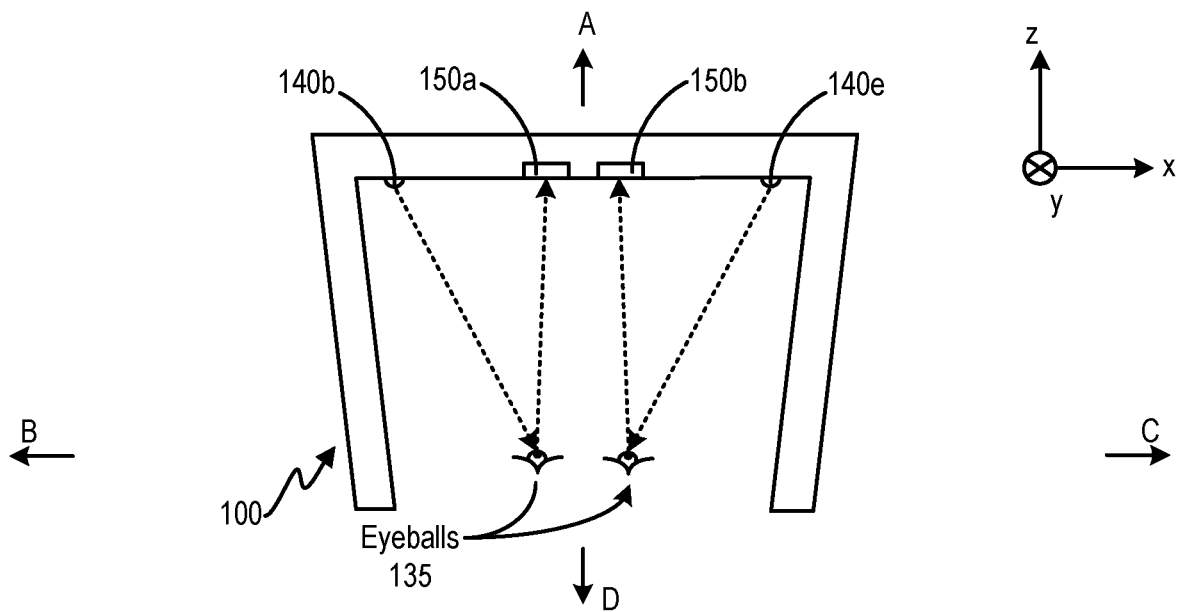
Figure 2:
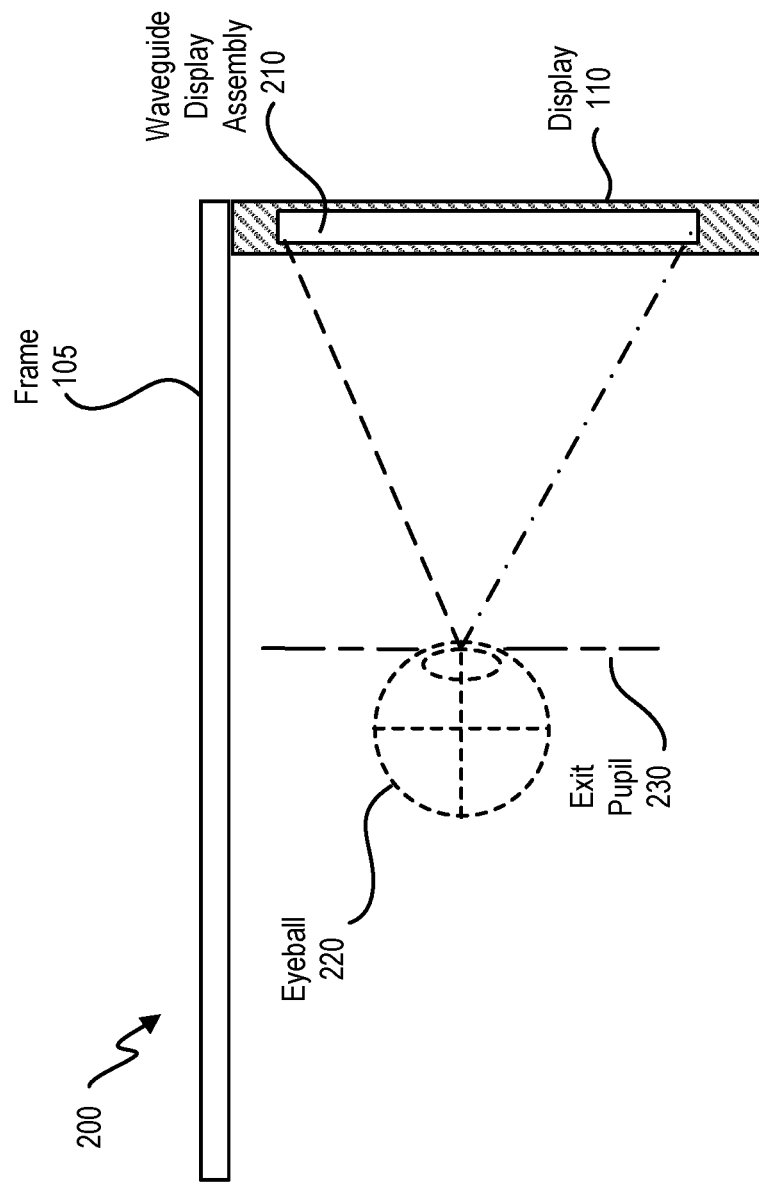
FIG. 2 is an example of a cross section of the near-eye display.

FIG. 2 is an example of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some examples, near-eye display 100 includes one or more optical elements between waveguide display assembly 210 and eyeball 220.

In some examples, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate examples, waveguide display assembly 210 may include the stacked waveguide display and the varifocal waveguide display.

Figure 3:
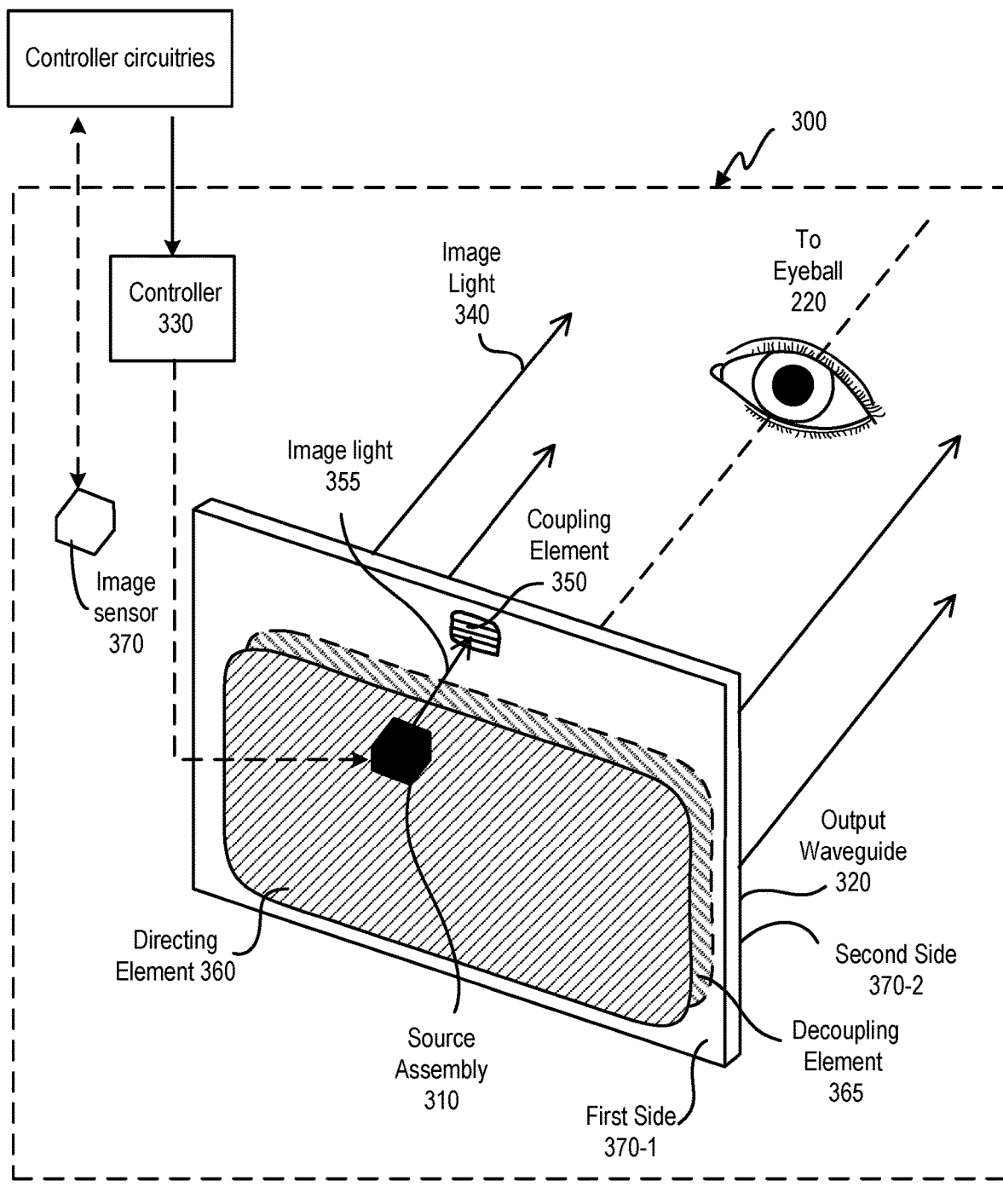
FIG. 3 illustrates an isometric view of an example of a waveguide display with a single source assembly.

FIG. 3 illustrates an isometric view of an example of a waveguide display 300. In some examples, waveguide display 300 is a component (e.g., waveguide display assembly 210) of near-eye display 100. In some examples, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some examples, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some examples, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some examples, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
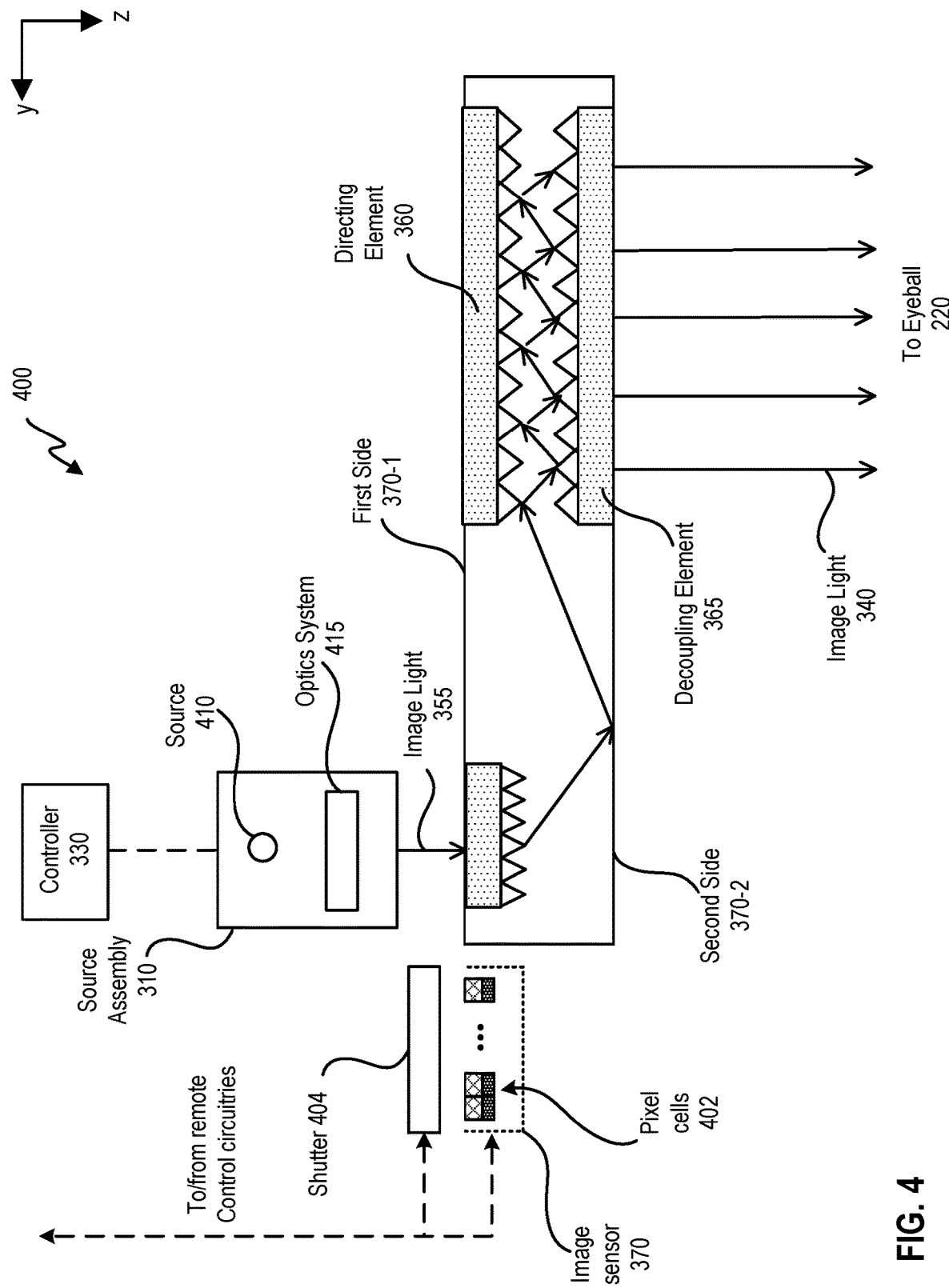
FIG. 4 illustrates a cross section of an example of the waveguide display.

FIG. 4 illustrates an example of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some examples, there can be a mechanical shutter 404 interposed between the set of pixel cells 402 and the physical environment to control the exposure of the set of pixel cells 402. In some examples, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an integration period. During the integration period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some examples, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In examples where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In examples where directing element 360 is a diffraction grating, the pitch of the diffraction grating is chosen to cause incident image light 355 to exit output waveguide 320 at angle(s) of inclination relative to a surface of decoupling element 365.

In some examples, directing element 360 and/or decoupling element 365 are structurally similar. Expanded image light 340 exiting output waveguide 320 is expanded along one or more dimensions (e.g., may be elongated along x-dimension). In some examples, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
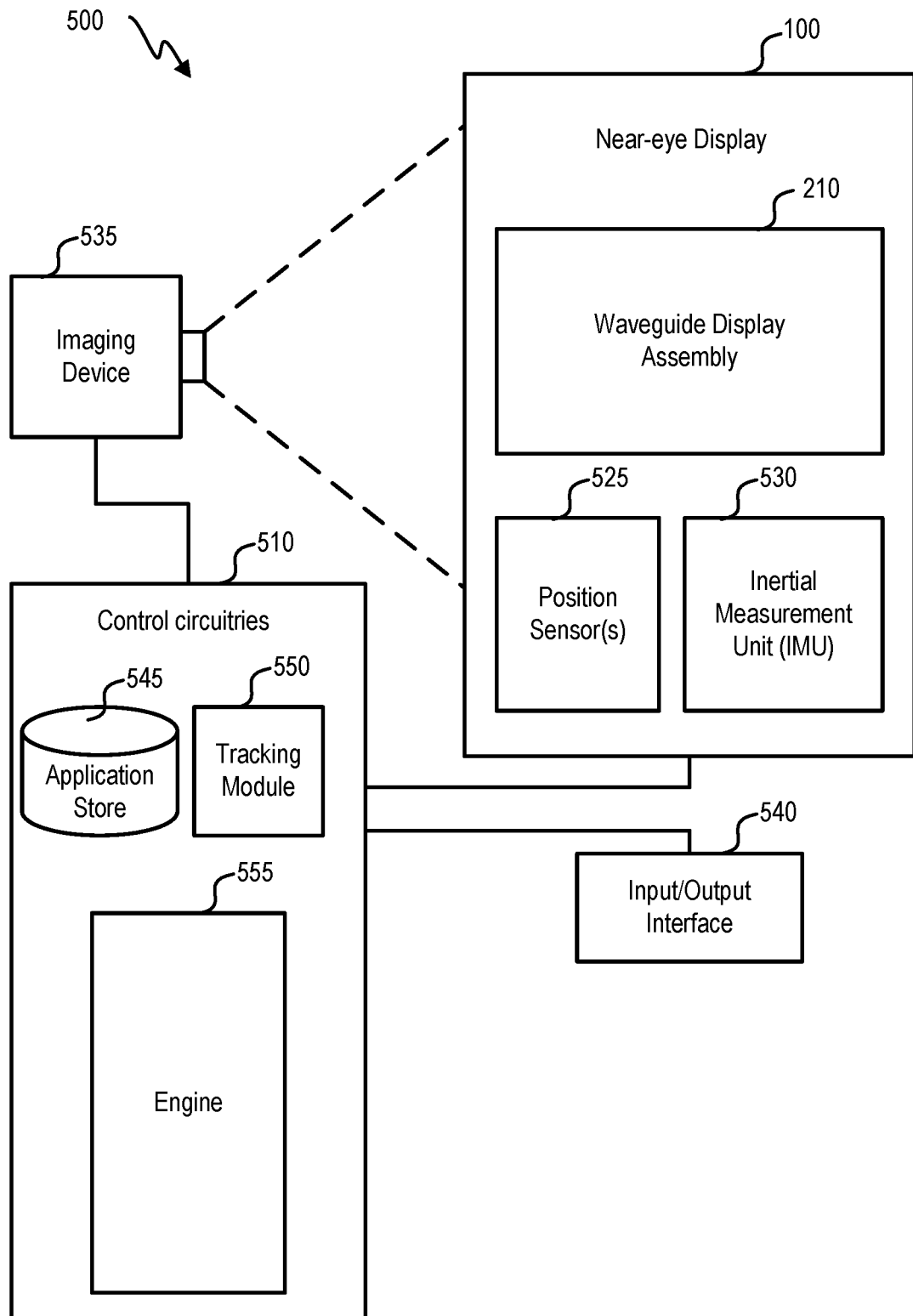
FIG. 5 is a block diagram of an example of a system including the near-eye display.

FIG. 5 is a block diagram of an example of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some examples, audio is presented via an external device (e.g., speakers and/or headphones) that receives audio information from near-eye display 100 and/or control circuitries 510 and presents audio data based on the audio information to a user. In some examples, near-eye display 100 may also act as an AR eyewear glass. In some examples, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provide media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback applications, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some examples, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), or a gaze point of the user (e.g., based on image data provided by imaging device 535), a distance between an object and user (e.g., based on image data provided by imaging device 535).

Figure 6:
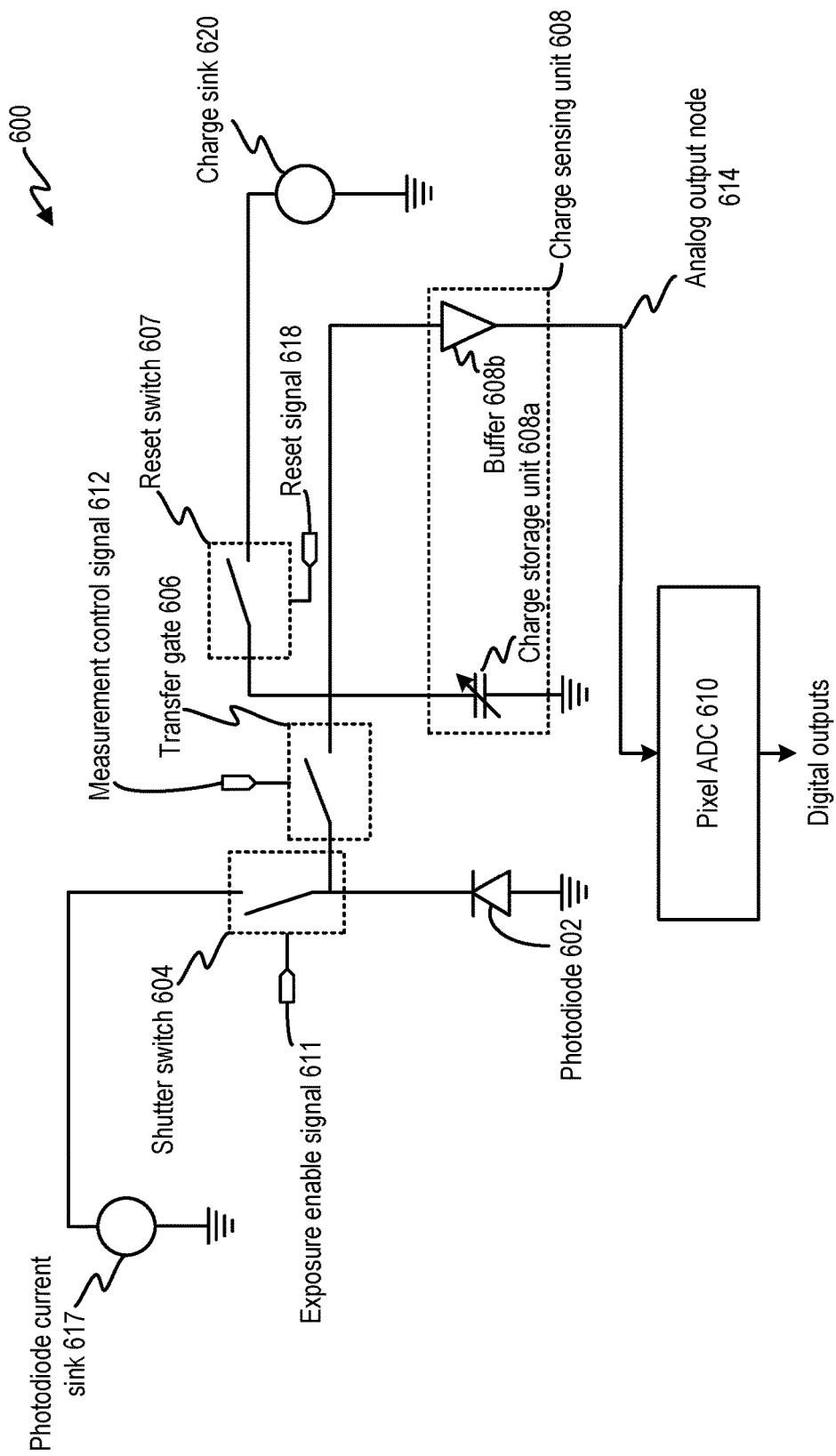
FIG. 6 illustrates block diagrams of examples of a pixel cell.

FIG. 6 illustrates an example of a pixel cell 600. Pixel cell 600 may be part of a pixel array and can generate digital intensity data corresponding to a pixel of an image. For example, pixel cell 600 may be part of pixel cells 402 of FIG. 4. As shown in FIG. 6, pixel cell 600 may include a photodiode 602 as well as processing circuits including a shutter switch 604, a transfer gate 606, a reset switch 607, a charge sensing unit 608 comprising a charge storage unit 608a and a buffer 608b, and a pixel ADC 610.

In some examples, photodiode 602 may include, for example, a P-N diode, a P-I-N diode, a pinned diode, etc. Photodiode 602 can generate charge upon receiving light, and the quantity of charge generated can be proportional to the intensity of the light. Photodiode 602 can also store some of the generated charge until the photodiode saturates, which occurs when the well capacity of the photodiode is reached. Moreover, each of shutter switch 604, transfer gate 606, and reset switch 607 can include a transistor. The transistor may include, for example, a metal-oxide-semiconductor field-effect transistor (MOSFET), a bipolar junction transistor (BJT), etc. Shutter switch 604 can act as an electronic shutter gate (in lieu of, or in combination with, mechanical shutter 404 of FIG. 4) to control an integration period of pixel cell 600. During the integration period, shutter switch 604 can be disabled (turned off) by exposure enable signal 611, which allows photodiode 602 to store the generated charge and, when photodiode 602 saturates, allows the overflow charge to flow to charge storage unit 608a. At the end of the integration period, shutter switch 604 can be enabled to steer the charge generated by photodiode 602 into photodiode current sink 617. Moreover, reset switch 607 can also be disabled (turned off) by reset signal 618, which allows charge storage unit 608a to accumulate the charge. Charge storage unit 608a can be a device capacitor at a floating terminal of transfer gate 606, a metal capacitor, a MOS capacitor, or any combination thereof. Charge storage unit 608a can convert a quantity of charge to an analog voltage, which can be measured by pixel ADC 610 to provide a digital output representing the incident light intensity. After a mode of measurement completes, reset switch 607 can be enabled to empty the charge stored at charge storage unit 608a to charge sink 620, to make charge storage unit 608a available for the next measurement.

Figure 7A:
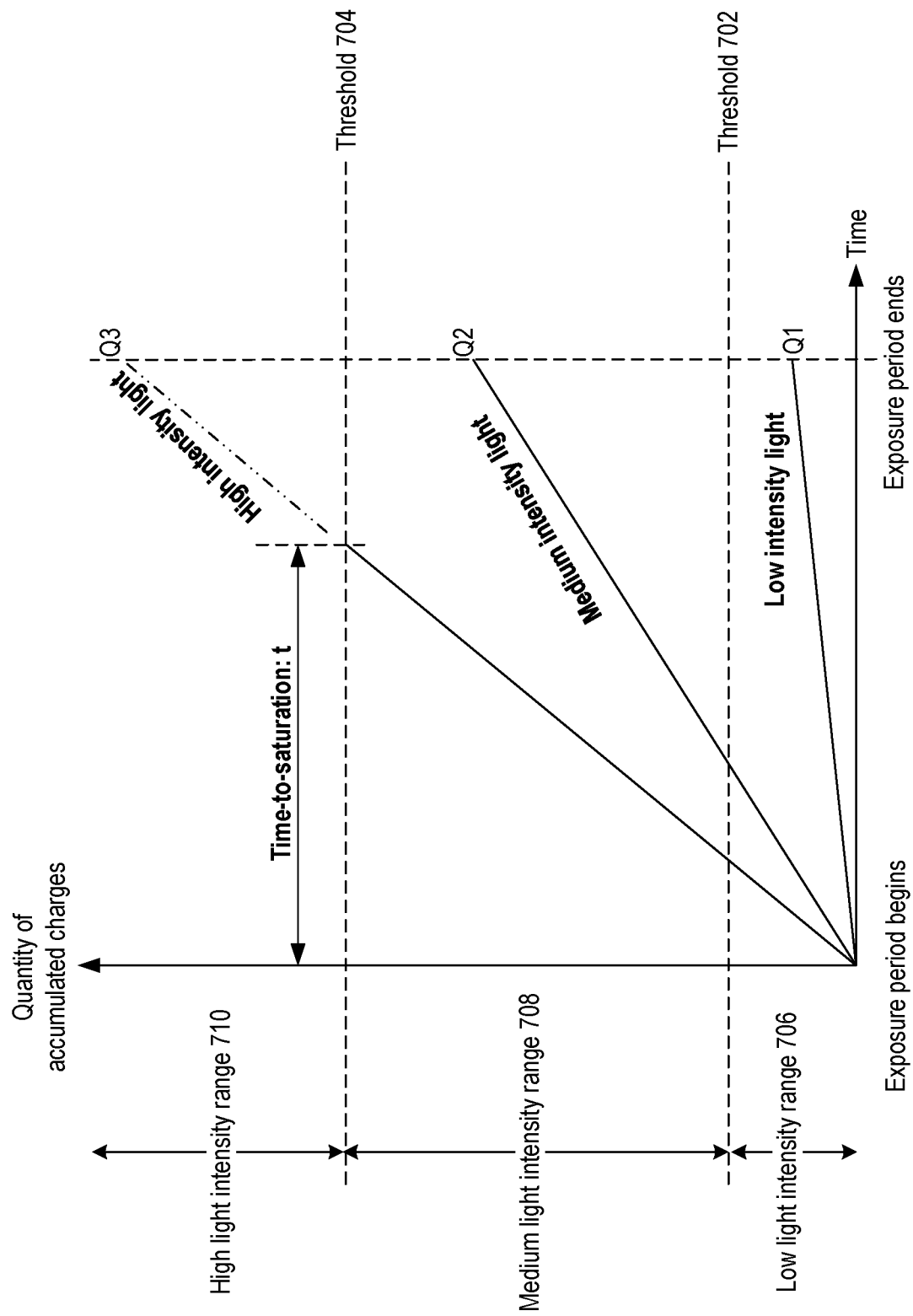
FIG. 7A, FIG. 7B, and FIG. 7C illustrate aspects of operations for determining light intensities of different ranges by examples of FIG. 6.

Reference is now made to FIG. 7A, which illustrates a quantity of charge accumulated with respect to time for different light intensity ranges. The total quantity of charge accumulated at a particular time point can reflect the intensity of light incident upon photodiode 602 during an integration period. The quantity can be measured when the integration period ends. A threshold 702 and a threshold 704 can be defined for a threshold's quantity of charge defining a low light intensity range 706, a medium light intensity range 708, and a high light intensity range 710 for the intensity of the incident light. For example, if the total accumulated charge is below threshold 702 (e.g., Q1), the incident light intensity is within low light intensity range 706. If the total accumulated charge is between threshold 704 and threshold 702 (e.g., Q2), the incident light intensity is within medium light intensity range 708. If the total accumulated charge is above threshold 704, the incident light intensity is within medium light intensity range 710. The quantity of the accumulated charge, for low and medium light intensity ranges, can correlate with the intensity of the incident light, if the photodiode does not saturate within the entire low light intensity range 706 and the measurement capacitor does not saturate within the entire medium light intensity range 708.

The definitions of low light intensity range 706 and medium light intensity range 708, as well as thresholds 702 and 704, can be based on the storage capacities of photodiode 602 and charge storage unit 608a. For example, low light intensity range 706 can be defined such that the total quantity of charge stored in photodiode 602, at the end of the integration period, is below or equal to the storage capacity of the photodiode, and threshold 702 can be based on the storage capacity of photodiode 602. As to be described below, threshold 702 can be set based on a scaled storage capacity of photodiode 602 to account for potential capacity variation of the photodiode. Such arrangements can ensure that, when the quantity of charge stored in photodiode 602 is measured for intensity determination, the photodiode does not saturate, and the measured quantity relates to the incident light intensity. Moreover, medium light intensity range 708 can be defined such that the total quantity of charge stored in charge storage unit 608a, at the end of the integration period, is below or equal to the storage capacity of the measurement capacitor, and threshold 704 can be based on the storage capacity of charge storage unit 608a. Typically threshold 704 is also set to be based on a scaled storage capacity of charge storage unit 608a to ensure that when the quantity of charge stored in charge storage unit 608a is measured for intensity determination, the measurement capacitor does not saturate, and the measured quantity also relates to the incident light intensity. As to be described below, thresholds 702 and 704 can be used to detect whether photodiode 602 and charge storage unit 608a saturate, which can determine the intensity range of the incident light and the measurement result to be output.

In addition, in a case where the incident light intensity is within high light intensity range 710, the total overflow charge accumulated at charge storage unit 608a may exceed threshold 704 before the integration period ends. As additional charge is accumulated, charge storage unit 608a may reach full capacity before the end of the integration period, and charge leakage may occur. To avoid measurement error caused due to charge storage unit 608a reaching full capacity, a time-to-saturation measurement can be performed to measure the time duration it takes for the total overflow charge accumulated at charge storage unit 608a to reach threshold 704. A rate of charge accumulation at charge storage unit 608a can be determined based on a ratio between threshold 704 and the time-to-saturation, and a hypothetical quantity of charge (Q3) that could have been accumulated at charge storage unit 608a at the end of the integration period (if the capacitor had limitless capacity) can be determined by extrapolation according to the rate of charge accumulation. The hypothetical quantity of charge (Q3) can provide a reasonably accurate representation of the incident light intensity within high light intensity range 710.

Figure 7B:
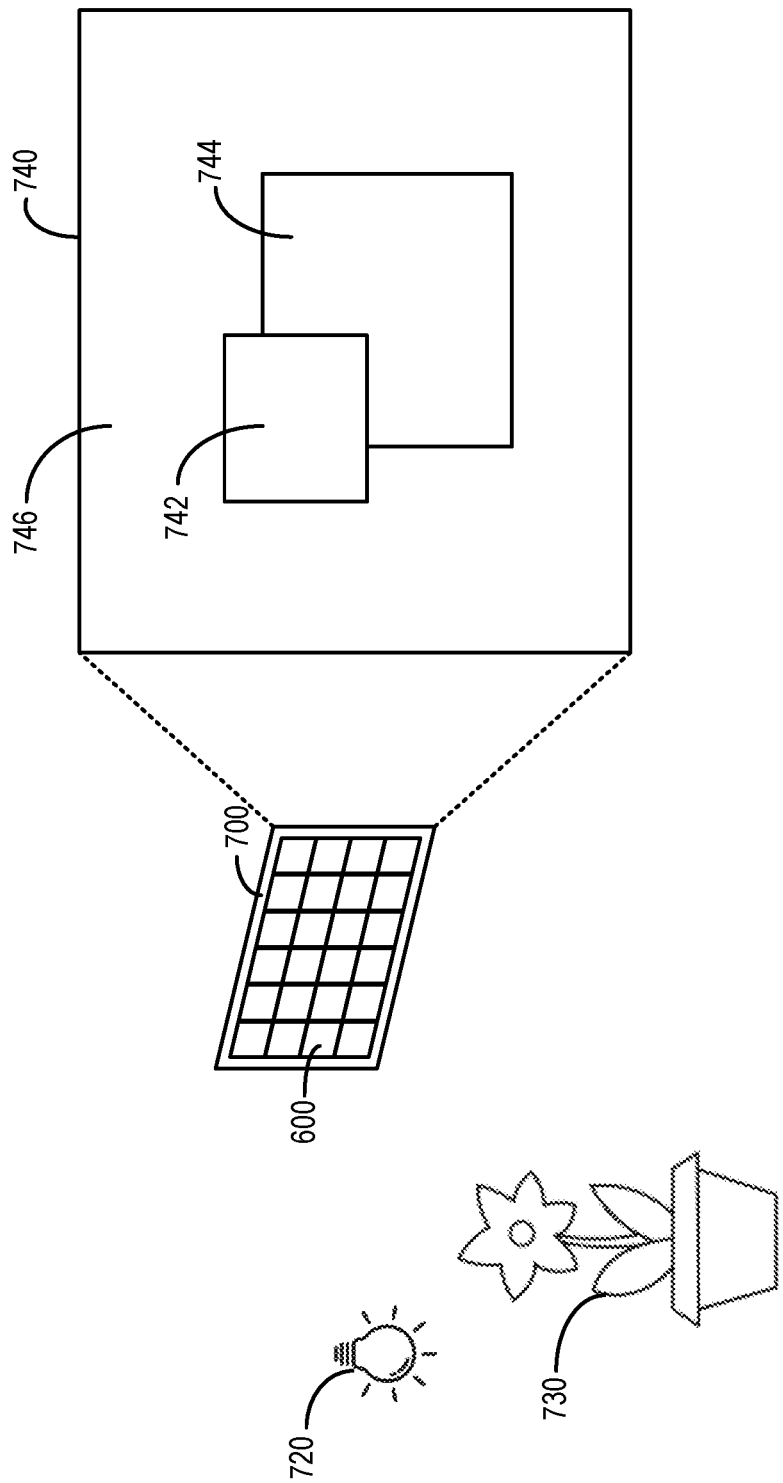

Depending on the application, a pixel cell 600 may predominantly detect light of a particular intensity range. For example, referring to FIG. 7B, a pixel cell array 700 including pixel cells 600 may be operated to capture a scene of an outdoor environment during night time, and the outdoor environment comprises a light source 720 and an object 730. An image 740 captured by pixel cell array 700 may include, for example, an image region 742 of high light intensity (e.g., corresponding to an image of light source 720), an image region 744 of medium light intensity (e.g., corresponding to an image of object 730), and an image region 746 of low light intensity (e.g., corresponding to the nighttime background). A pixel cell 600 in the region of pixel cell array 700 corresponding to image region 742 can predominantly measure light of high light intensity range 710. Moreover, a pixel cell 600 in the region of pixel cell array 700 corresponding to image region 744 can predominantly measure light of medium light intensity range 708. Further, a pixel cell 600 in the region of pixel cell array 700 corresponding to image region 746 can predominantly measure light of low light intensity range 706.

Figure 7C:
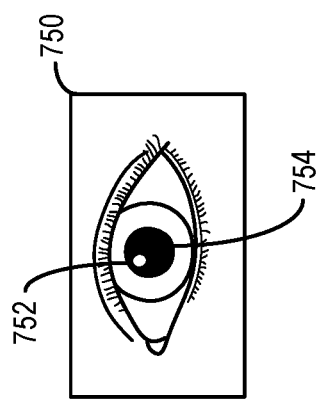

In addition, some applications may use only a subset of the intensity ranges of FIG. 7A. One example is gaze point determination. As shown in FIG. 7C, a pixel cell array including pixel cell 600 can be used to capture an image 750 of an eye ball, and image 750 may include a glint patch 752 and a pupil patch 754. Glint patch 752 may be generated based on detection of very high intensity light reflected off the cornea surface of the eyeball. The intensity of light reflected off the cornea surface can be at the higher end of high intensity range 710. Moreover, pupil patch 754 may be generated based on detection of low intensity light reflected off the pupil of the eyeball. The intensity of light reflected off the pupil of the eyeball can be at the lower end of low intensity range 706. A gaze direction of the user can be determined based on the image locations of glint patch 752 and pupil patch 754 within image 750. To improve the accuracy of detection of the glint patches and pupil patches, which in turns improves the tracking of the gaze direction, pixel cell 600 needs to be able to measure both very high intensity light and very low intensity light with high fidelity but not in between including medium light intensity range 708.

Referring back to FIG. 6, transfer gate 606 can be controlled by a measurement control signal 612 to control the charge accumulations at residual charge capacitor 603 and charge storage unit 608a for different light intensity ranges as described above. To measure high light intensity range 710 and medium light intensity range 708, transfer gate 606 can be controlled to operate in a partially turned-on state. For example, the gate voltage of transfer gate 606 can be set based on a voltage developed at photodiode 602 corresponding to the charge storage capacity of the photodiode. With such arrangements, only overflow charge (e.g., charge generated by the photodiode after the photodiode saturates) will transfer through transfer gate 606 to reach charge storage unit 608a, to measure time-to-saturation (for high light intensity range 710) and the quantity of charge stored in charge storage unit 608a (for medium light intensity range 708). Moreover, to measure low light intensity range 706, transfer gate 606 can be controlled in a fully turned-on state to transfer the charge stored in photodiode 602 to charge storage unit 608a, to measure the quantity of the charge stored in photodiode 602.

The analog voltage developed at charge storage unit 608a due to accumulate of charge can be buffered by buffer 608b to generate a replica of the analog voltage (but with larger driving strength) at analog output node 614. The analog voltage at analog output node 614 can be converted into a digital output (e.g., comprising logical ones and zeros) by pixel ADC 610. The analog voltage developed at charge storage unit 608a can be sampled and digital output can be generated before the end of the integration period (e.g., for medium light intensity range 708 and high light intensity range 710), or after the integration period (for low light intensity range 706). The digital output can be transmitted to, for example, control circuitries 510 of FIG. 5, to represent the light intensity during the integration period.

In some examples, the capacitance of charge storage unit 608a can be configurable to improve the accuracy of light intensity determination for a low light intensity range. For example, the capacitance of charge storage unit 608a can be reduced when charge storage unit 608a is used to measure the residual charge stored at residual charge capacitor 603. The reduction in the capacitance of charge storage unit 608a can increase the charge-to-voltage conversion ratio at charge storage unit 608a, such that a higher voltage can be developed for a certain quantity of stored charge. The higher charge-to-voltage conversion ratio can reduce the effect of measurement errors (e.g., quantization error, comparator offset, etc.) introduced by pixel ADC 610 on the accuracy of low light intensity determination. The measurement error can set a limit on a minimum voltage difference that can be detected and/or differentiated by pixel ADC 610. By increasing the charge-to-voltage conversion ratio, the quantity of charge corresponding to the minimum voltage difference can be reduced, which in turn reduces the lower limit of a measurable light intensity by pixel cell 600 and extends the dynamic range. On the other hand, for medium light intensity, the capacitance of charge storage unit 608a can be increased to ensure that the charge storage unit 608a has sufficient capacity to store a quantity of charge up to, for example, the quantity defined by threshold 704.

Figure 8:
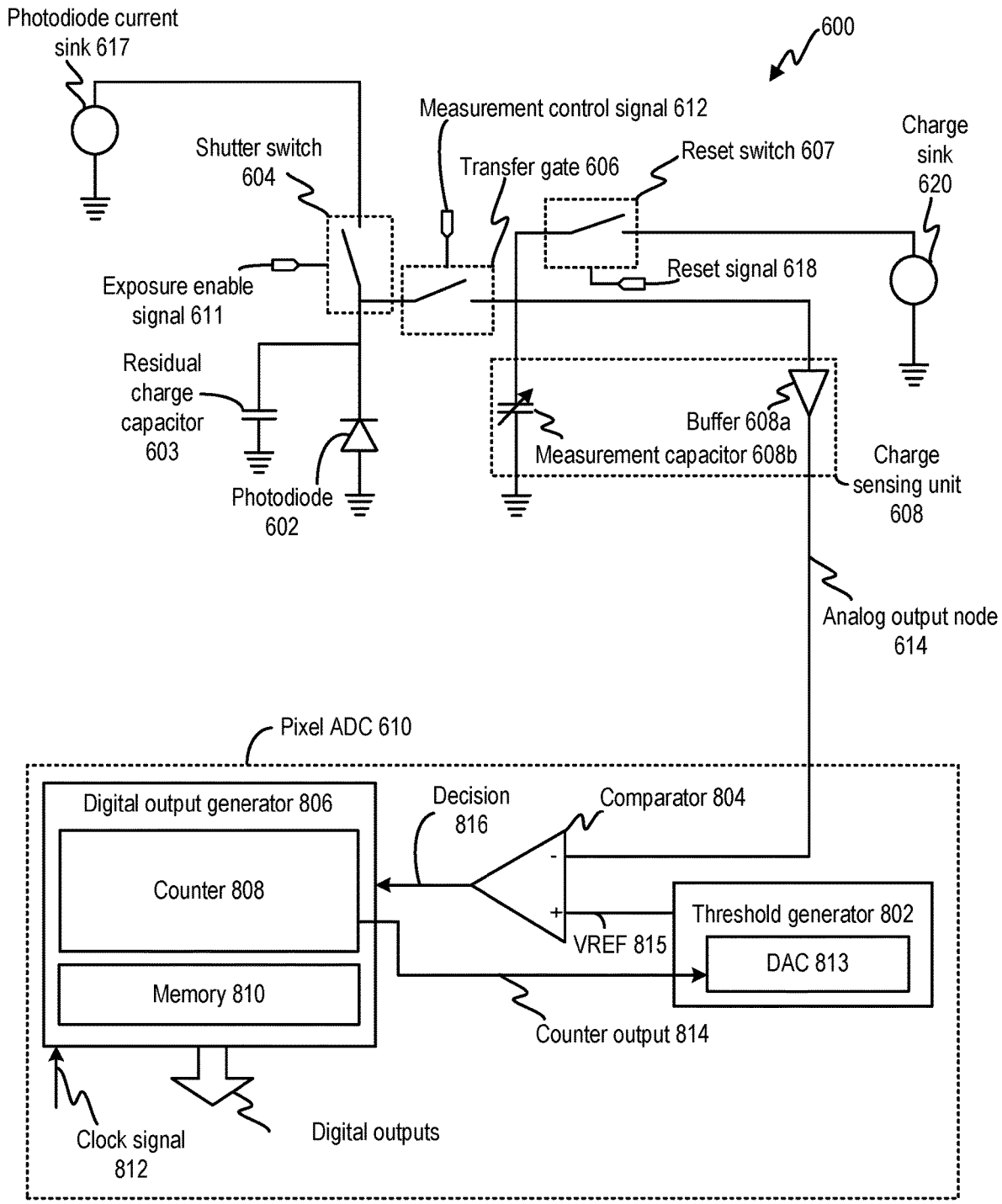
FIG. 8 illustrates examples of internal components of the pixel cell of FIG. 6.

FIG. 8 illustrates an example of the internal components of pixel ADC 610. As shown in FIG. 8, pixel ADC 610 includes a threshold generator 802, a comparator 804, and a digital output generator 806. Digital output generator 806 may further include a counter 808 and a memory 810. Counter 808 can generate a set of count values based on a free-running clock signal 812, whereas memory 810 can store at least some of the count values (e.g., the latest count value) generated by counter 808. In some examples, memory 810 may be part of counter 808. Memory 810 can be, for example, a latch circuit to store the counter value based on local pixel value as described below. Threshold generator 802 includes a digital-to-analog converter (DAC) 813 which can accept a set of digital values and output a reference voltage (VREF) 815 representing the set of digital values. As to be discussed in more detail below, threshold generator 802 may accept static digital values to generate a fixed threshold, or accept output 814 of counter 808 to generate a ramping threshold.

Although FIG. 8 illustrates that DAC 813 (and threshold generator 802) is part of pixel ADC 610, it is understood that DAC 813 (and threshold generator 802) can be coupled with multiple digital output generators 806 from different pixel cells. Moreover, at least part of digital output generator 806, such as counter 808, can be shared among a plurality of multiple pixel cells to generate the digital values.

Comparator 804 can compare the analog voltage developed at analog output node 614 against the threshold provided by threshold generator 802, and generate a decision 816 based on the comparison result. For example, comparator 804 can generate a logical one for decision 816 if the analog voltage at analog output node 614 equals or exceeds the threshold generated by threshold generator 802. Comparator 804 can also generate a logical zero for decision 816 if the analog voltage falls below the threshold. Decision 816 can control the counting operations of counter 808 and/or the count values stored in memory 810, to perform the aforementioned time-of-saturation measurement of a ramping analog voltage at analog output node 614 as well as quantization processing of the analog voltage at analog output node 614 for incident light intensity determination.

Figure 9B:
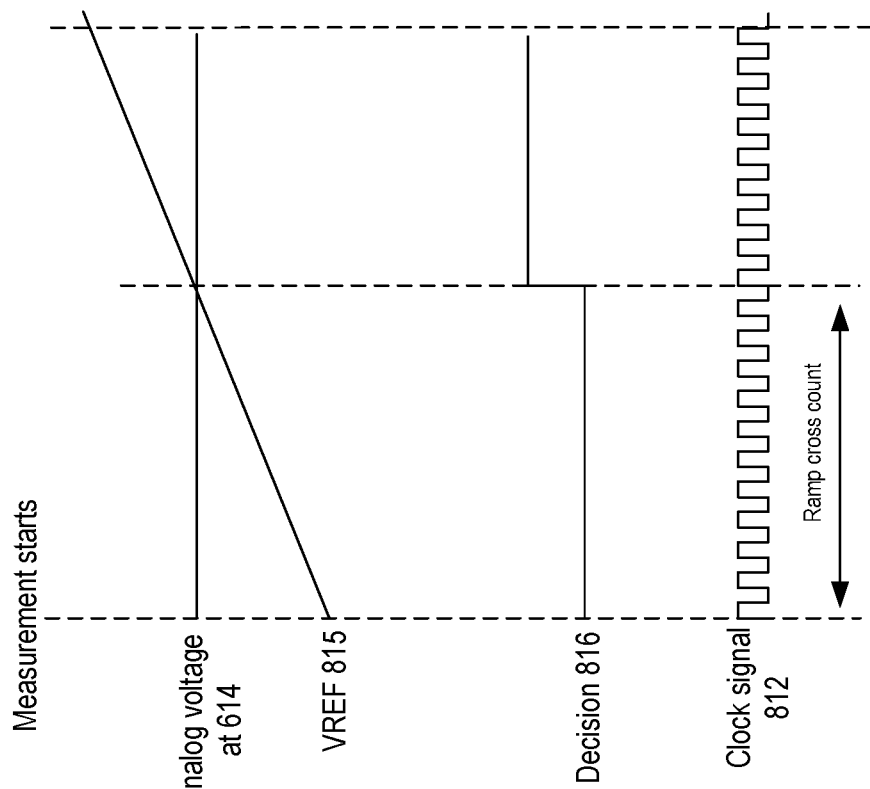
FIG. 9A and FIG. 9B illustrate example methods for determining a light intensity.
Figure 9A:
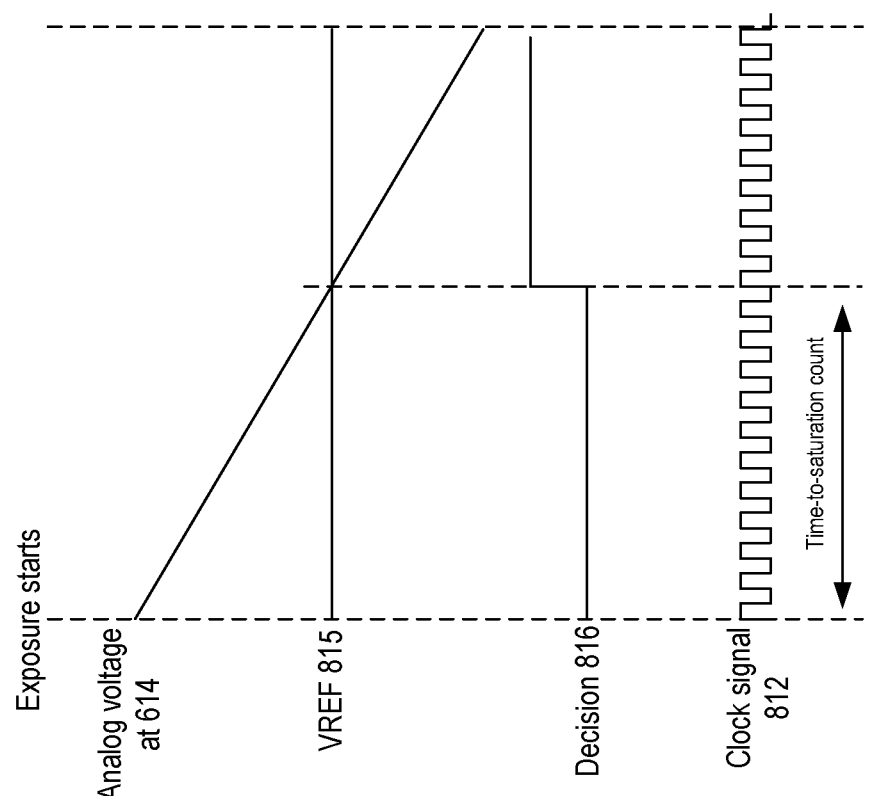

FIG. 9A illustrates an example of time-to-saturation measurement by pixel ADC 610. To perform the time-to-saturation measurement, threshold generator 802 can control DAC 813 to generate a fixed VREF 815. Fixed VREF 815 can be set at a voltage corresponding a charge quantity threshold for saturation of charge storage unit 608a (e.g., threshold 704 of FIG. 7). Counter 808 can start counting right after the integration period starts (e.g., right after shutter switch 604 is disabled). As the analog voltage at analog output node 614 ramps down (or up depending on the implementation), clock signal 812 keeps toggling to update the count value at counter 808. The analog voltage may reach the fixed threshold at a certain time point, which causes decision 816 by comparator 804 to flip. The flipping of decision 816 may stop the counting of counter 808, and the count value at counter 808 may represent the time-to-saturation. As to be discussed in more details below, a rate of charge accumulation at charge storage unit 608a can also be determined based on the duration, and the incident light intensity can be determined based on the rate of charge accumulation.

FIG. 9B illustrates an example of quantizing an analog voltage by pixel ADC 610. After measurement starts, DAC 813 may be programmed by counter output 714 to generate a ramping VREF 815, which can either ramp up (in the example of FIG. 9B) or ramp down depending on implementation. The voltage range of ramping VREF 815 can be between threshold 704 (charge quantity threshold for saturation of charge storage unit 608a) and threshold 702 (charge quantity threshold for saturation of photodiode 602), which can define the medium light intensity range. In the example of FIG. 9B, the quantization process can be performed with uniform quantization steps, with VREF 815 increasing (or decreasing) by the same amount for each clock cycle of clock signal 812. The amount of increase (or decrease) of VREF 815 corresponds to a quantization step. When VREF 815 reaches within one quantization step of the analog voltage at analog output node 614, decision 816 by comparator 804 flips from negative to positive. The flipping of decision 816 may stop the counting of counter 808, and the count value can correspond to a total number of quantization steps accumulated to match, within one quantization step, the analog voltage. The count value corresponds to a measurement of time it takes for VREF 815 to reach the analog voltage and can be a digital representation of the quantity of charge stored at charge storage unit 608a, as well as the digital representation of the incident light intensity. As discussed above, the quantization of the analog voltage can occur during the integration period (e.g., for medium light intensity range 708) and after the integration period (e.g., for low light intensity range 706).

As discussed above, ADC 610 can introduce quantization errors when there is a mismatch between a quantity of charge represented by the quantity level output by ADC 610 (e.g., represented by the total number of quantization steps) and the actual input quantity of charge that is mapped to the quantity level by ADC 610. The quantization error can be reduced by using a smaller quantization step size. In the example of FIG. 9B, the quantization step size can be reduced by the amount of increase (or decrease) in VREF 815 per clock cycle based on, for example, reducing input range 902 of the quantization operation (between thresholds 702 and 704), reducing the corresponding range of time to be measured by counter 808, increasing the clock frequency of clock signal 812, or any combination therefore.

Although quantization error can be reduced by using smaller quantization step sizes, area and performance speed may limit how far the quantization step can be reduced. For example, in a case where the clock frequency of clock signal 812 is increased while input range 902 remains the same, the total number of quantization steps needed to represent a particular range of charge quantities (and light intensity) may increase. A larger number of data bits may be needed to represent the increased number of quantization steps (e.g., 8 bits to represent 255 steps, 7 bits to represent 127 steps, etc.). The larger number of data bits may require additional buses to be added to pixel output buses 616, which may not be feasible if pixel cell 600 is used on a head-mounted device or other wearable devices with very limited spaces. Moreover, with a larger number of quantization step size, ADC 610 may need to cycle through a larger number of quantization steps before finding the quantity level that matches (with one quantization step), which leads to increased processing power consumption and time, and reduced rate of generating image data. The reduced rate may not be acceptable for some applications that require a high frame rate (e.g., an application that tracks the movement of the eyeball).

Figures 10A, 10B:
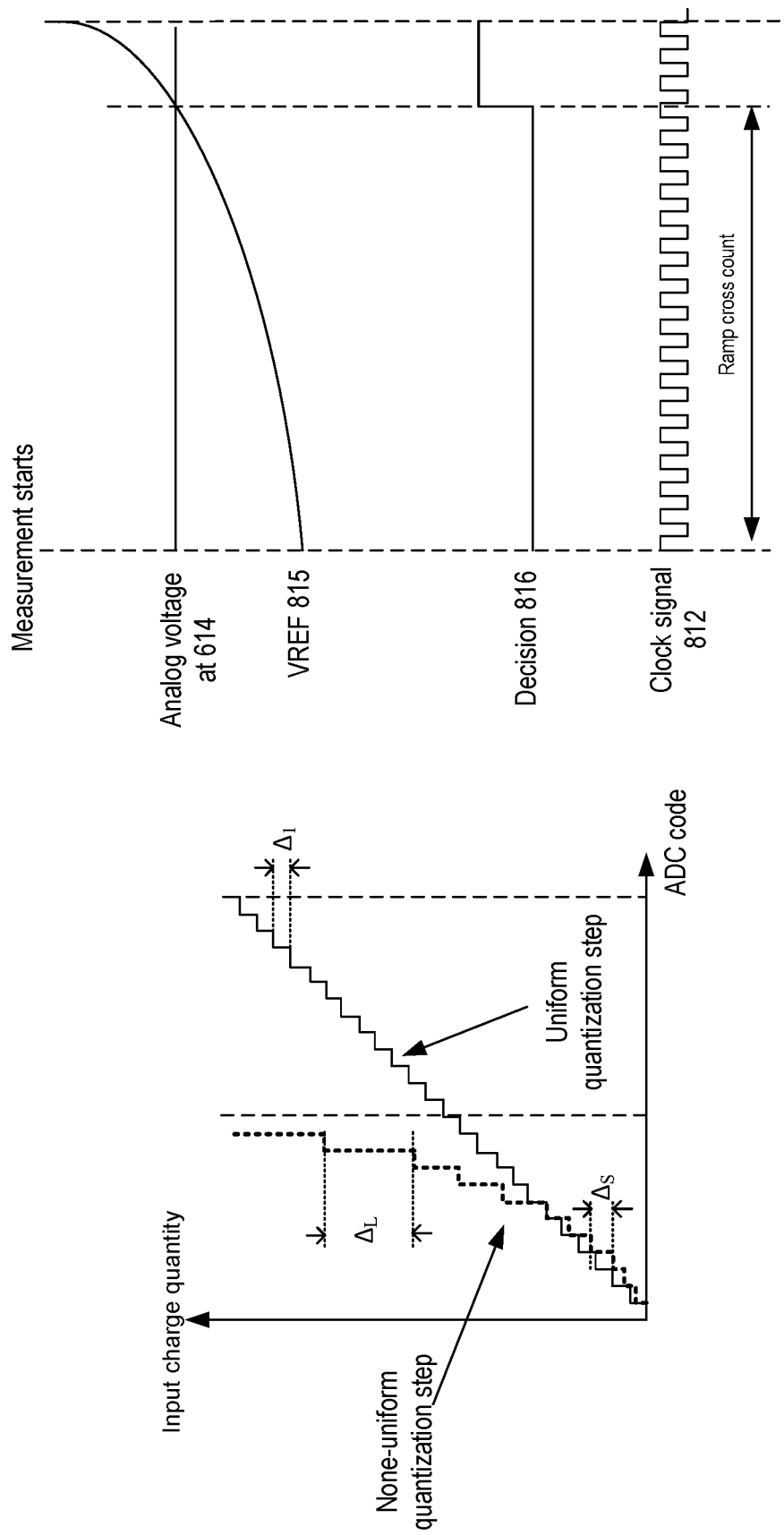
FIG. 10A and FIG. 10B illustrate techniques for performing quantization.

One way to reduce quantization error is by employing a non-uniform quantization scheme, in which the quantization steps are not uniform across the input range. FIG. 10A illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 610 can be reduced. Therefore, the reduced quantization errors can push down the lower limit of the measureable light intensity of the image sensor, and the dynamic range can be increased. Moreover, although the quantization errors are increased for the high input charge quantities, the quantization errors may remain small compared with high input charge quantities.

Therefore, the overall quantization errors introduced to the measurement of the charge can be reduced. On the other hand, the total number of quantization steps covering the entire range of input charge quantities may remain the same (or even reduced), and the aforementioned potential problems associated with increasing the number of quantization steps (e.g., increase in area, reduction in processing speed, etc.) can be avoided.

FIG. 10B illustrates an example of quantizing an analog voltage by pixel ADC 610 using a non-uniform quantization process. Compared with FIG. 9B (which employs a uniform quantization process), VREF 815 increases in a non-linear fashion with each clock cycle, with a shallower slope initially and a steeper slope at a later time. The differences in the slopes are attributed to the uneven quantization step sizes. For lower counter count values (which correspond to a lower input quantity range), the quantization steps are made smaller, hence VREF 815 increases at a slower rate. For higher counter count values (which correspond to a higher input quantity range), the quantization steps are made larger, hence VREF 815 increases at a higher rate. The uneven quantization steps in VREF 815 can be introduced using different schemes. For example, as discussed above, DAC 813 is configured to output voltages for different counter count values (from counter 808). DAC 813 can be configured such that the difference in the output voltage between two neighboring counter count values (which defines the quantization step size) is different for different counter count values. As another example, counter 808 can also be configured to generate jumps in the counter count values, instead of increasing or decreasing by the same count step, to generate the uneven quantization steps. In some examples, the non-uniform quantization process of FIG. 10B can be employed for light intensity determination for low light intensity range 706 and medium light intensity range 708.

Figure 11:
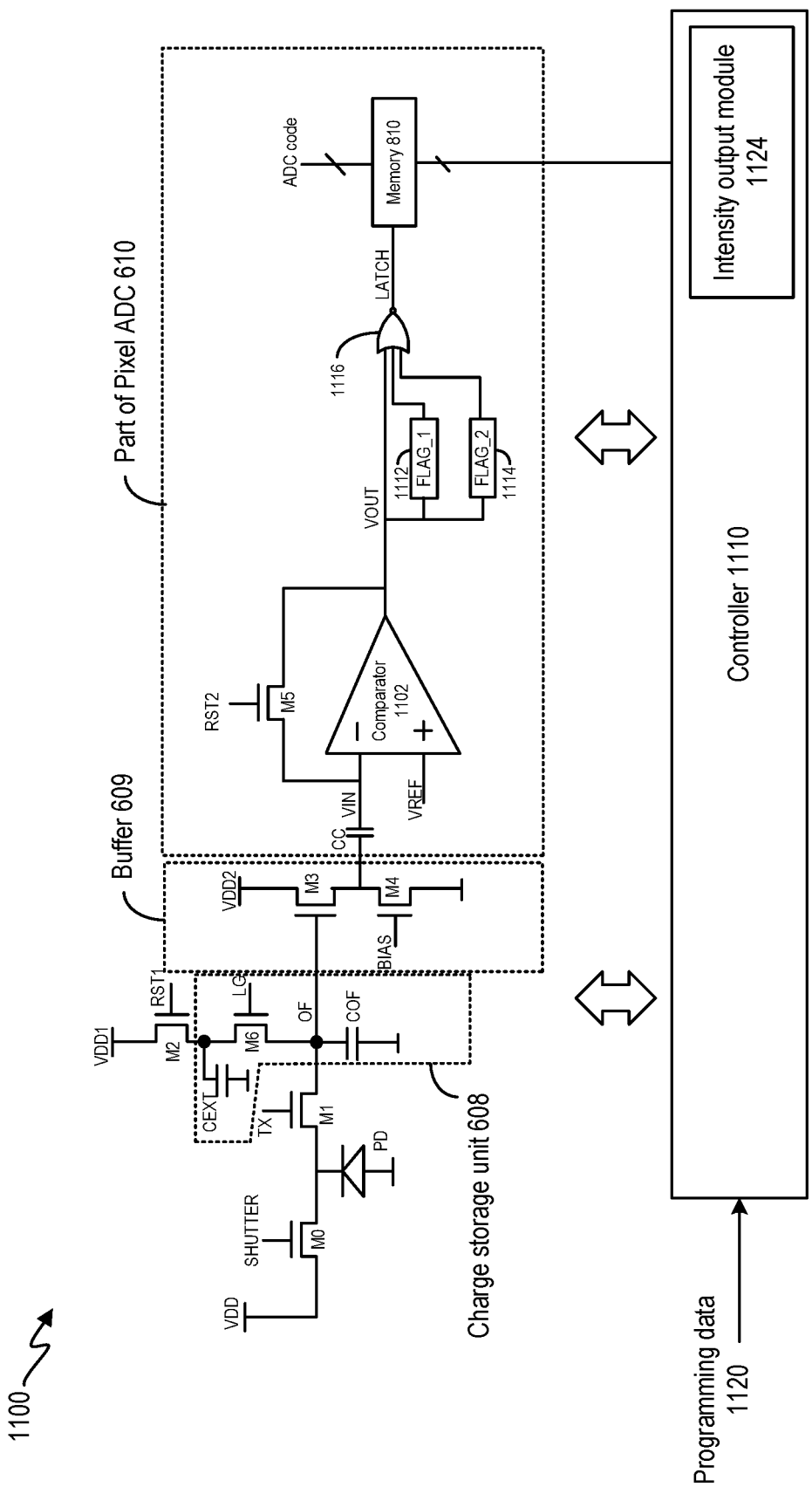
FIG. 11 illustrates block diagrams of an example of a pixel cell.

Reference is now made to FIG. 11, which illustrates an example of pixel cell 1100, which can be an example of pixel cell 600 of FIG. 6. In the example of FIG. 11, PD can correspond to photodiode 602, transistor M0 can correspond to shutter switch 604, transistor M1 can correspond to transfer gate 606, whereas transistor M2 can correspond to reset switch 607. Moreover, a combination of COF and CEXT capacitors can correspond to charge storage unit 608a. COF capacitor can be the parasitic capacitor of a floating drain node. The capacitance of charge storage unit 608a is configurable by the signal LG. When LG is enabled, charge storage unit 608a provides combined capacities of COF and CEXT capacitors. When LG is disabled, CEXT capacitor can be disconnected from the parallel combination, and charge storage unit 608a comprises only a COF capacitor (plus other parasitic capacitances). As discussed above, the capacitance of charge storage unit 608a can be reduced to increase the charge-to-voltage conversion ratio for the low light intensity determination, and can be increased to provide the requisite capacity for the medium light intensity determination.

Pixel cell 1100 further includes an example of buffer 608b and an example of pixel ADC 610. For example, transistors M3 and M4 form a source follower which can be buffer 608b of FIG. 6 to buffer an analog voltage developed at the OF node, which represents a quantity of charge stored at the COF capacitor (or at the COF and CEXT capacitors). Further, the CC capacitor, comparator 1102, transistor M5, NOR gate 1112, together with memory 810, can be part of pixel ADC 610 to generate a digital output representing the analog voltage at the OF node. As described above, the quantization can be based on a comparison result (VOUT), generated by comparator 1102, between the analog voltage developed at the OF node and VREF. Here, the CC capacitor is configured to generate a VIN voltage (at one input of comparator 1102) which tracks the output of buffer 608b, and provides the VIN voltage to comparator 1102 to compare against VREF. VREF can be a static voltage for time-of-saturation measurement (for high light intensity range) or a ramping voltage for quantization of an analog voltage (for low and medium light intensity ranges). The ADC code can be generated by a free-running counter (e.g., counter 808), and the comparison result generated by comparator 1102 can determine the ADC code to be stored in memory 810 and to be output as the digital representation of the incident light intensity. In some examples, the generation of VREF for low and medium light intensity determination can be based on a non-uniform quantization scheme as discussed in FIG. 10A and FIG. 10B.

Pixel cell 1100 includes techniques that can further improve the accuracy of the incident light intensity determination, in addition to the techniques disclosed above. For example, the combination of the CC capacitor and transistor M5 can be used to compensate for measurement errors (e.g., comparator offset) introduced by comparator 1102, as well as other error signals that are introduced to comparator 1102, such that the accuracy of comparator 1102 can be improved. The noise signals may include, for example, reset noise charge introduced by reset switch 607, a noise signal at the output of buffer 608b due to source follower threshold mismatches, etc. A quantity of charge reflecting the comparator offset as well as the error signals can be stored at the CC capacitor during a reset phase, when both transistors M2 and M5 are enabled. A voltage difference can also be developed across the CC capacitor during the reset phase due to the stored charge. During a measurement phase, the voltage difference across the CC capacitor remains, and the CC capacitor can track the output voltage of buffer 608b by subtracting away (or adding) the voltage difference to generate VIN. As a result, the VIN voltage can be compensated for the measurement errors and the error signals, which improves the accuracy of the comparison between VIN and VREF and the ensuing quantization.

In addition, pixel cell 1100 further includes a controller 1110. Controller 1110 can generate a sequence of control signals, such as SHUTTER, TX, RST1, RST2, etc., to operate pixel cell 1100 to perform a three-phase measurement operation corresponding to the three light intensity ranges of FIG. 7A (e.g., low light intensity range 706, medium light intensity range 708, and high light intensity range 710). In each phase, pixel cell 1100 can be operated in a measurement mode targeted for the corresponding light intensity range, and determine whether the incident light intensity falls within the corresponding light intensity range based on the decision output (VOUT) of comparator 1102. Pixel cell 1100 further includes a set of registers to store the decision outputs of some of the phases as FLAG_1 and FLAG_2 signals. Based on the FLAG_1 and FLAG_2 signals, controller 1110 can select the ADC code from one of the three phases to represent the incident light intensity. The selected ADC code can be stored in memory 810, and memory 810 can be locked based on a combination of the FLAG_1 and FLAG_2 signals by NOR gate 1116 to prevent subsequent measurement phases from overwriting the selected ADC code output in memory 810. At the end of the three-phase measurement process, controller 1110 can retrieve the ADC code stored in memory 810. Memory 810 can be part of pixel cell 1100 or external to pixel cell 1100.

In addition, controller 1110 can receive programming data 1120 to configure the sequence of control signals. Programming data 1120 can be received from a host device operating an application that consumes image data generated by pixel cell 1100. As to be described below, the configuration can include setting the duration of the integration period of charge at charge storage unit 608a, omitting one or more of the three-phase measurement processes, repeating one or more of the three phase measurement processes to quantize multiple samples of the incident light intensity, etc., and can be based on the application operating at the host device. In some examples, controller 1110 further includes an intensity output module 1124 to generate an output based on the samples. In some examples, intensity output module 1124 can also be external to pixel cell 1100.

Figure 12:
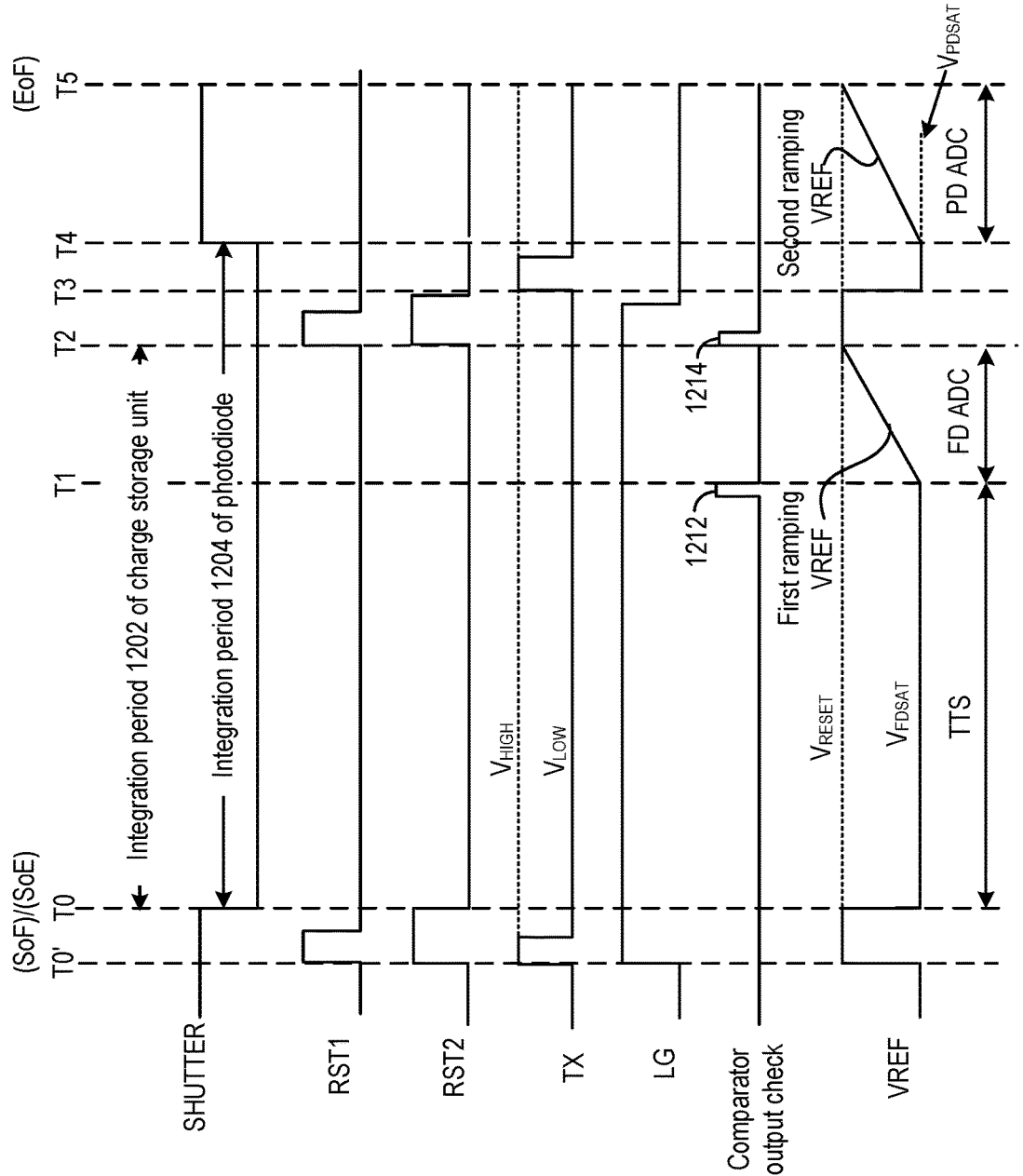
FIG. 12 illustrates an example sequence of control signals to perform light intensity measurement.

Reference is now made to FIG. 12, which illustrates a sequence of control signals of pixel cell 1100 for the three-phase measurement operation within a frame period. Referring to FIG. 12, the time between T0' and T0 corresponds to a first reset phase. Time T0 can correspond to start of frame (SoF), which starts an integration period 1202 of photodiode PD as well as an integration period 1204 of charge storage unit 608a. A time-to-saturation (TTS) measurement operation can be performed in the time period between T0 and T1, followed by a FD ADC measurement operation in the time period between T1 and T2, both of which are to measure the overflow charge stored in charge storage unit 608a. In addition, the time period between T2 and T3 includes a second reset phase followed by transfer of charge stored in photodiode 602 to the floating drain. Moreover, in the time period between T3 and T4, residual charge can be transferred to charge storage unit 608a and measured. In the time period between T4 and T5, a PD ADC measurement operation can be performed to measure the residual charge stored in charge storage unit 608a. Pixel cell 1100 can provide the digital output representing the incident light intensity to generate the image frame at time T5. Time T5 can correspond to an end of frame time (EoF). The three-phase measurement operation can then be repeated for the next frame period to generate a subsequent image frame.

As shown in FIG. 12, before T0, the RST1 and RST2 signals, the LG signal, and the shutter signal, are asserted, whereas the TX signal is biased at a voltage $V_{LOW}$. $V_{LOW}$ can correspond to the charge capacity of the photodiode PD to allow only overflow charge (if any) to flow from the photodiode PD to the CEXT capacitor and the COF capacitor via transistor M1. With such arrangements, both photodiode PD, as well as the CEXT capacitor and the COF capacitor, can be reset. Moreover, no charge is added to the capacitors because the charge generated by photodiode PD is diverted away by transistor M0. The voltage across the photodiode PD, as well as the OF node, can be set to a voltage equal to $V_{RESET}$, which can represent a state where the photodiode PD, the CEXT capacitor, and the COF capacitor do not store any charge. Further, comparator 1102 is also in a reset phase, and the CC capacitor can store charge reflecting the reset noise introduced by M2, the comparator offset, the threshold mismatch of buffer 608b, etc. In addition, the VREF can also be set to a value equal to $V_{RESET}$. In some examples, $V_{RESET}$ can be equal to a supply voltage (e.g., VDD) to pixel cell 1100. Moreover, counter 808 can be in a reset state.

At time T0, counter 808 can start counting from an initial value (e.g., zero). During the time period between T0 and T1, the shutter signal is de-asserted, while the LG signal remains asserted and the TX signal remains at $V_{LOW}$. VREF can be set to a value equal to $V_{FDSAT}$, which can correspond to a voltage of the OF node when both CEXT and COF capacitors are at capacity. The difference between $V_{FDSAT}$ and $V_{RESET}$ can correspond to, for example, threshold 704 of FIG. 7. During the time period between T0 and T1, a time-to-saturation (TTS) measurement can be performed, in which overflow charge flows from the photodiode PD to the COF capacitor and the CEXT capacitor via transistor M1 to develop a ramping voltage at OF node. A buffered and error-compensated version of analog voltage at the OF node (VIN) can be compared against $V_{FDSAT}$ while counter 808 is free-running. If the total charge stored at the COF capacitor and the CEXT capacitor exceeds threshold 704 (based on the OF node voltage), the output of comparator 1102 can flip, which indicates that incident light is in the high intensity range and the TTS measurement result can be used to represent the intensity of incident light. Therefore, the count value generated by counter 808 at the time of flipping can be stored into memory 810. A checking 1212 of the output of comparator 1102 can be made at time T1, and the flipping of comparator 1102 also causes controller 1110 to assert the FLAG_1 signal in register 1112. The non-zero FLAG_1 signal value can cause the output of NOR gate 1116 to remain low regardless of other inputs to the NOR gate, and can lock the memory and prevent subsequent measurement phases from overwriting the count value. On the other hand, if comparator 1102 never flips during the time period between T1 and T2, which indicates that the incident light intensity is below the high light intensity range, the FLAG_1 signal stays zero. Controller 1110 does not update the FLAG_2 value stored in register 1114 between time period T0-T1, and the FLAG_2 value can remain zero.

At time T1, counter 808 can restart counting from its initial value (e.g., zero). During the time period between T1 and T2, the FD ADC operation can be performed, in which the analog voltage at the OF node can be quantized by ADC 610 to measure the quantity of overflow charge stored in the CEXT capacitor and the COF capacitor. In some examples, during the time period T1-T2, photodiode PD can be shielded from incident light (e.g., by mechanical shutter 404), so that the total overflow charge stored in the CEXT capacitor and the COF capacitor, and the analog voltage at the OF node, remain constant. A first ramping threshold voltage (labelled "first ramping VREF" in FIG. 12) can be supplied to comparator 1102 to be compared against the buffered and error-compensated version of analog voltage at the OF node (VIN). In some examples, the first ramping VREF can be generated by a DAC based on count values from the free running counter. If the ramping VREF matches the VIN (within one quantization step), the output of comparator 1102 can flip, and the count value generated by counter 808 at the time of flipping can be stored into memory 810, if the memory is not locked by the first phase of measurement (as indicated by the zero value of FLAG_1 signal). If the memory is locked, the count value will not be stored into memory 810.

In some examples, as shown in FIG. 12, the voltage range of the first ramping VREF can be between $V_{FDSAT}$ and $V_{RESET}$. $V_{FDSAT}$ can define the upper limit of the total overflow charge stored in the CEXT capacitor and the COF capacitor (when they are close to saturated), whereas $V_{RESET}$ can define the lower limit of the total overflow charge stored in the capacitors (when there is no overflow charge, hence the voltage of the OF node remains at $V_{RESET}$). The flipping of comparator 1102 in the FD ADC phase can indicate that the OF node voltage is lower than $V_{RESET}$, which may mean that the total overflow charge stored in the capacitors exceed the lower limit. Therefore, the flipping of comparator 1102 in the FD ADC phase can indicate that the photodiode PD saturates, hence there is overflow charge stored in the capacitors, and the quantization result of the overflow charge can represent the intensity of incident light. A checking 1214 of the output of comparator 1102 can be made at time T2 after the FD ADC phase, and controller 1110 can assert the FLAG_2 signal in register 1114 based on the flipping of comparator 1102 to lock the count value stored in memory 810, which prevents the subsequent phase from storing another count value in memory 810.

At the beginning of the time period between T2 and T3, both RST1 and RST2 signals can be asserted again for a second reset phase. The purpose of the second reset phase is to reset the CEXT and COF capacitors, and to prepare the COF capacitor for storing charge transferred from the PDCAP capacitor in the third phase of measurement (for low light intensity range). The second reset phase can end integration period 1202 of charge storage unit 608a. The LG signal can also be de-asserted to disconnect the CEXT capacitor from the COF capacitor and to reduce the capacitance of the measurement capacitor. The reduction of the capacitance is to increase the charge-to-voltage conversion ratio to improve the low light intensity determination, as discussed above. Comparator 1102 is also put into the reset state where the CC capacitor can be used to store the noise charge generated by the resetting of the CEXT and COF capacitors.

During the time period between T3 and T4, the RST1 and RST2 signals are de-asserted, whereas the bias TX can increase to $V_{HIGH}$ to fully turn on transistor M1. The charge stored in the photodiode PD can then move into the COF capacitor via M1. Between T3 and T4, the photodiode PD can also generate new charge and transfer the new charge to the COF capacitor via M1.

At time T4, the shutter signal is asserted, whereas the TX signal is de-asserted (e.g., setting to zero) or set back to $V_{LOW}$ to prevent charge stored at the COF capacitor from leaking via M1. Integration period 1204 of the photodiode PD ends at time T4. The PD ADC operation can start at time T4, in which a second ramping threshold voltage (labelled "second ramping VREF" in FIG. 12) can be supplied to comparator 1102 to be compared against the buffered and error-compensated version of analog voltage at the OF node (VIN). The second ramping VREF can have a voltage range between $V_{PDSAT}$, which represents the voltage at COF capacitor when it stores a quantity of residual charge that saturates the photodiode PD, and $V_{RESET}$. If the second ramping VREF matches the VIN (within one quantization step), the output of comparator 1102 may flip, and the count value generated by counter 808 at the time of flipping can be stored into memory 810, if the memory is not locked by the first phase of measurement (as indicated by the zero value of FLAG_1 signal) or by the second phase of measurement (as indicated by the zero value of FLAG_2 signal). The PD ADC operation ends at time T5, which can correspond to end of frame (EoF).

As described above, controller 1110 can receive programming data 1120 to configure the sequence of control signals. One example configuration can include increasing the frame period, which can also increase the duration of the photodiode integration time in which the photodiode generates and accumulates residual charge. Such arrangements can increase the time provided conversion of photons of very low intensity light to charge, and more charge can be accumulated for very low intensity light as a result, which can increase the signal-to-noise ratio for low intensity light measurement and push down the lower limit of the dynamic range. Such configuration can be provided for an application that performs gaze point determination as shown in FIG. 7C, which requires accurate detection of low intensity light for generating a pupil patch, and/or for generating image data for portions of a scene with low intensity light, such as image region 746 of FIG. 7B. In some examples, programming data 1120 can specify the duration of a frame period, and controller 1110 can control the timing of the control signals (e.g., RST1, RST2, TX, LG, VREF, etc. based on the frame period, and scale integration period 1204 of the photodiode according to the frame period.

In addition, another example configuration can include reducing the duration of integration period 1202 of charge storage unit 608a (between T0 and T2 in FIG. 12), which can be performed to offset the increase in the frame period and integration period 1204 of the photodiode PD (between T0 and T3 in FIG. 12). Such arrangements can provide various benefits. First, comparator 1102 is turned on and burns power during integration period 1202 of charge storage unit 608a for both the TTS and FD ADC operation. As comparator 1102 typically uses a lot of power, reducing the integration period 1202 of charge storage unit 608a can reduce the on-time of comparator 1102 and substantially reduce the overall power consumption of the TTS operation and the FD ADC operation. Second, the charge storage unit 608a, and the floating drain in particular, typically receive a large quantity of dark current. The reduced duration of integration period 1202 can reduce the quantity of dark charge accumulated by the floating drain due to dark current, which can further improve the accuracy of the TTS and the FD ADC operations. The reduced second integration time also does not lower the upper limit of the dynamic range, as the charge storage unit can saturate within a very short duration when the pixel cell receives light of very high intensity, and the TTS operation can still provide an accurate representation of the light intensity, which allows pixel cell 1100 to generate accurate outputs for glint patch 752 of FIG. 7C and image region 742 of FIG. 7B.

Figure 13A:
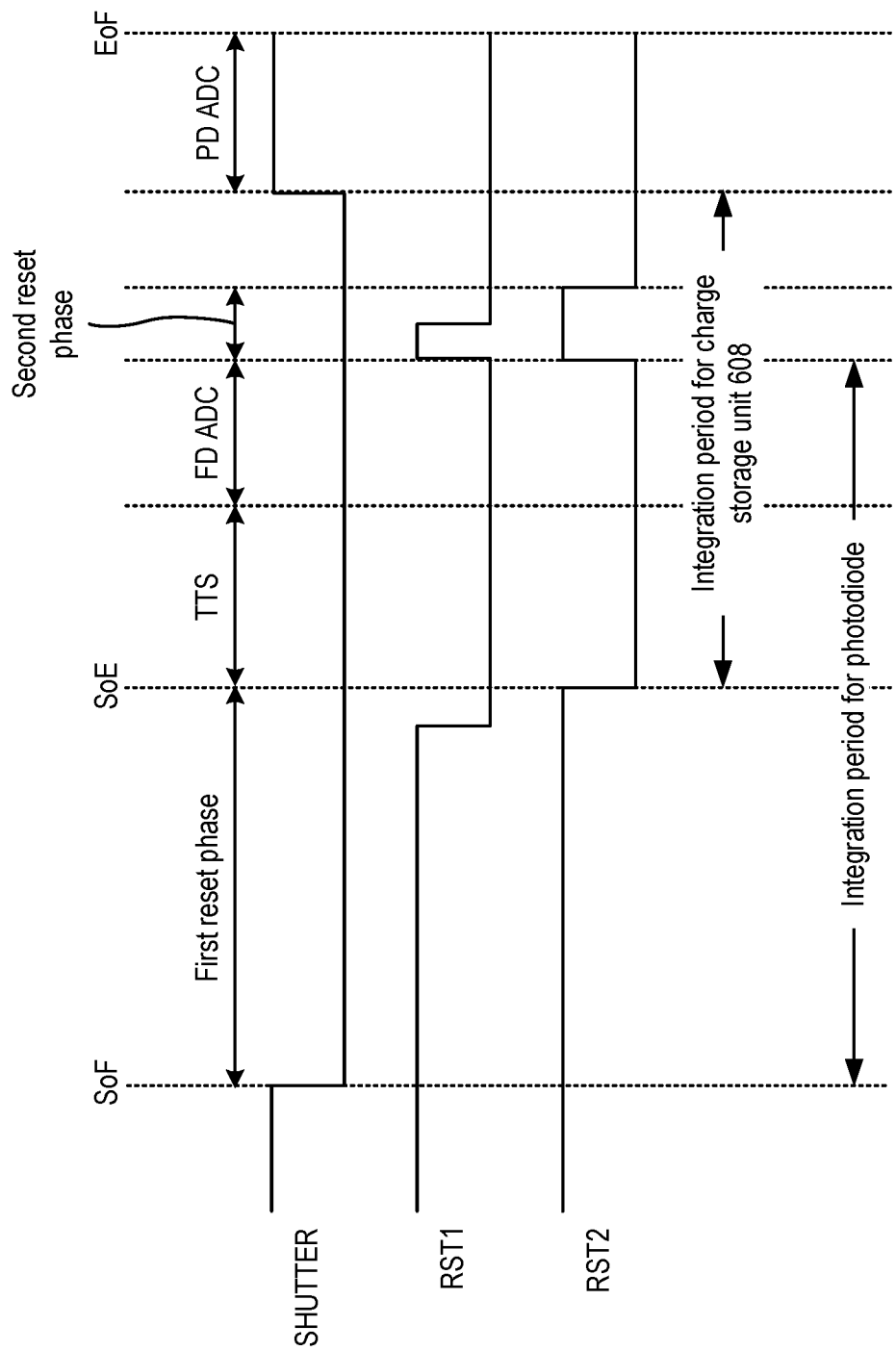
FIG. 13A and FIG. 13B illustrate another example sequence of control signals to perform light intensity measurement.
Figure 13B:
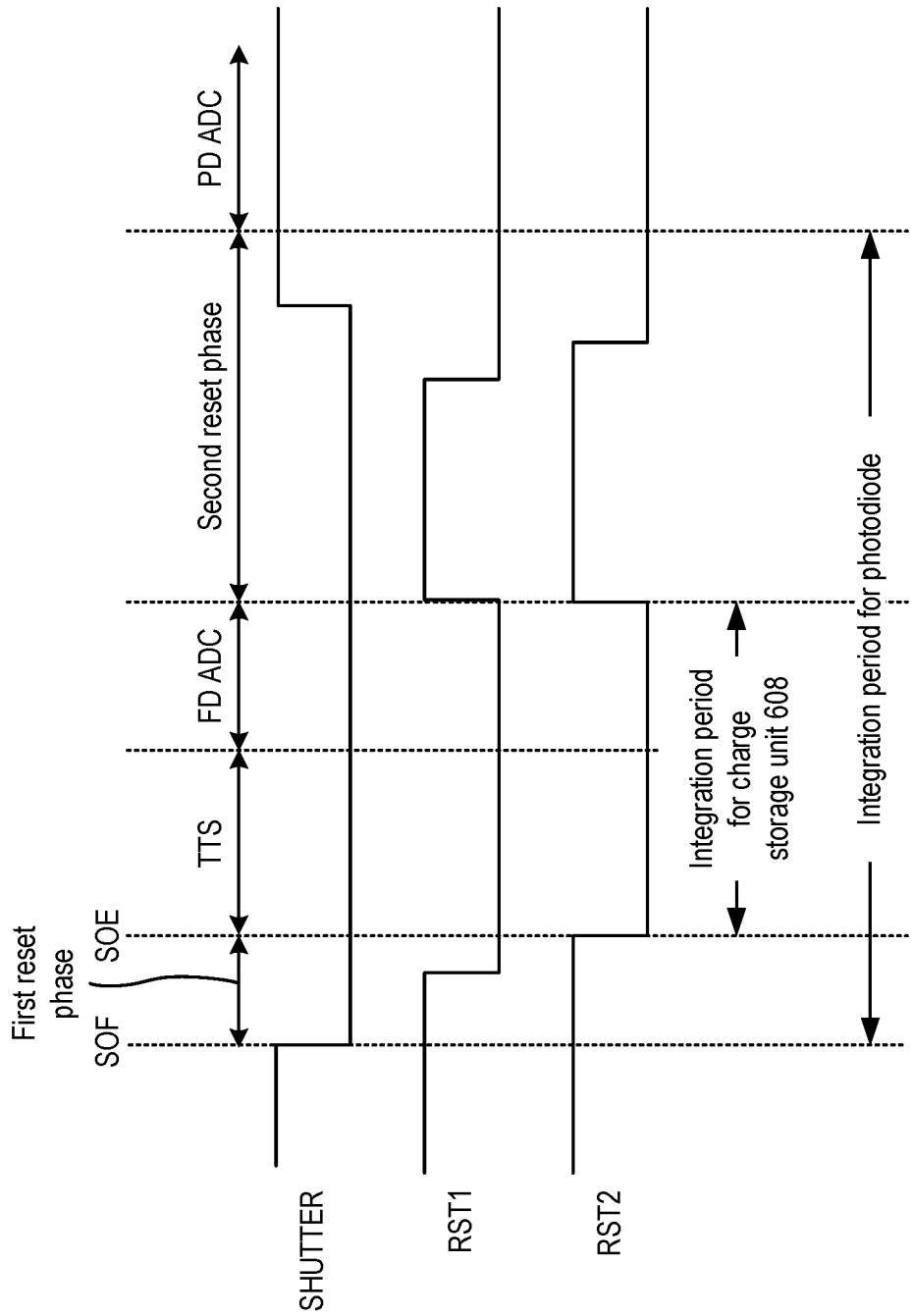

FIG. 13A and FIG. 13B illustrate example techniques for reducing the duration of the integration period 1202 of charge storage unit 608a. As shown in FIG. 13A, instead of aligning the de-assertion of the shutter signal and the end of the first reset phase, as in FIG. 12 at time T0, the first reset phase can continue after the shutter signal is de-asserted. Integration period 1204 of the photodiode PD still starts at SoF when the shutter signal is de-asserted, while the start of integration period 1202 of charge storage unit 608a can be delayed with respect to SoF to a later time point, labelled as start of exposure (SoE) in FIG. 13A. FIG. 13B illustrates another example technique for reducing the duration of integration period 1202 of charge storage unit 608a. As shown in FIG. 13B, the start time of the second reset phase can also be pulled forward with respect to the assertion of the shutter switch (which ends integration period 1204 of the photodiode PD) and EoF. In both FIG. 13A and FIG. 13B, the controller can start the TTS operation and then the FD ADC operation after the first reset phase ends, and ends the FD ADC operation when the second reset phase starts. The duration of the first reset phase and the second reset phase can be specified in programming data 1120, based on which controller 1110 can control the timing of the RST1 and RST2 signals. In some examples, programming data 1120 can also configure controller 1110 to skip one of the TTS/FD ADC measurement operations (e.g., by not providing a static VREF voltage or a ramping VREF voltage) to accommodate the reduced integration period 1202 of charge storage unit 608a.

Figure 14A:
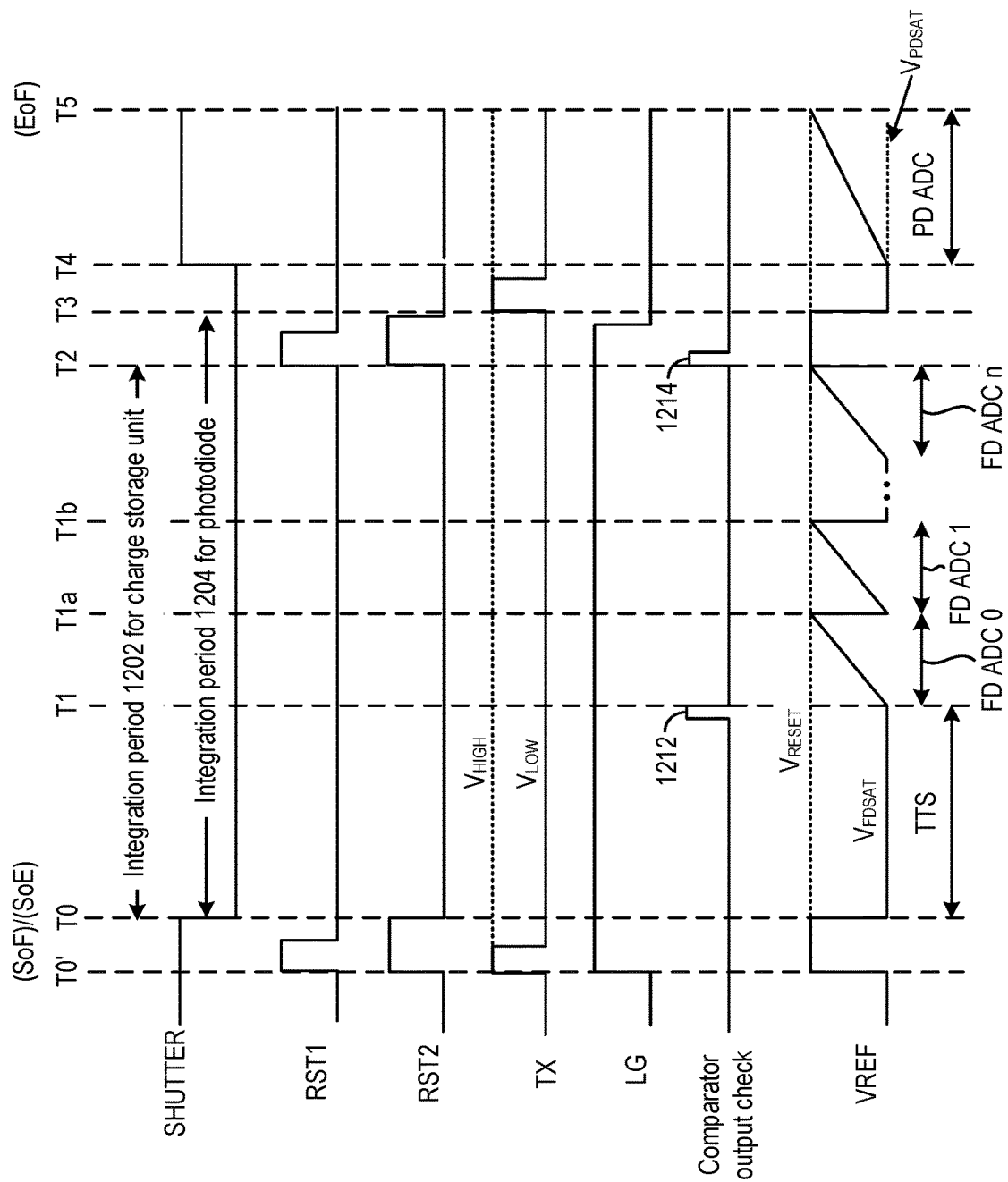
FIG. 14A, FIG. 14B, and FIG. 14C illustrate another example sequence of control signals to perform light intensity measurement and example results.
Figure 14B:
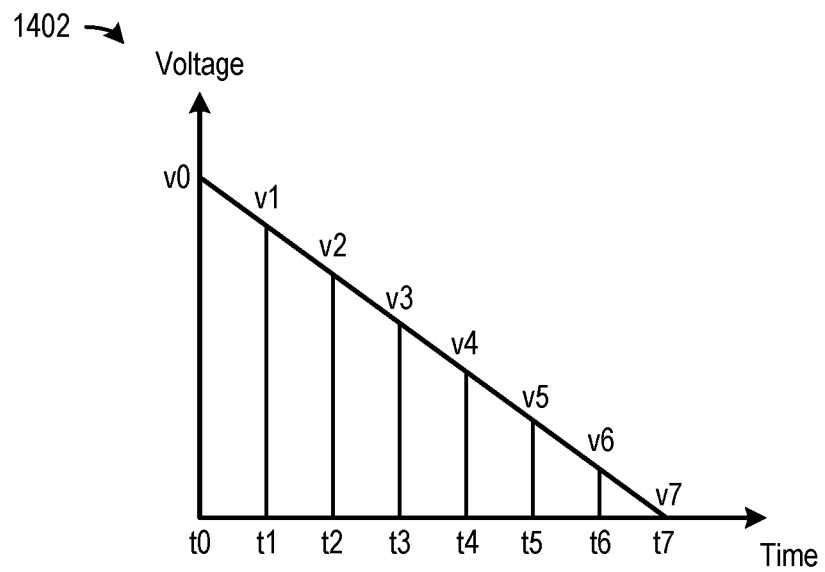
Figure 14B:
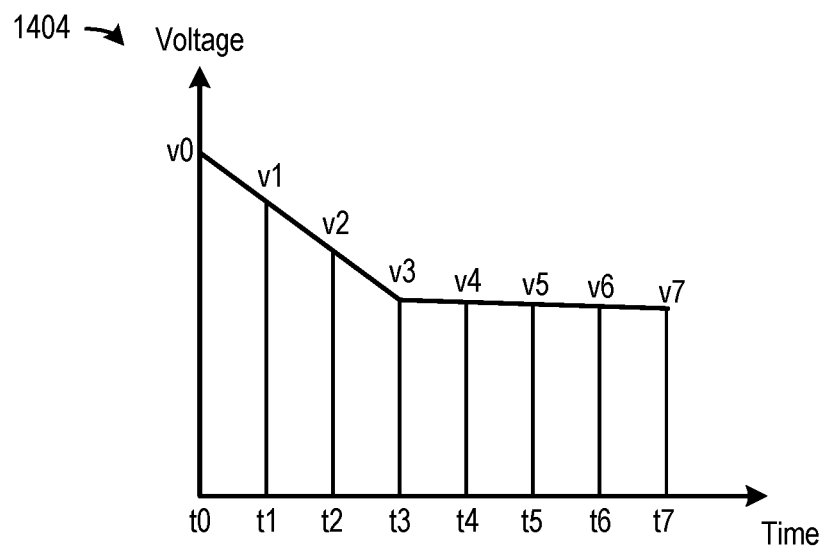
Figure 14C:
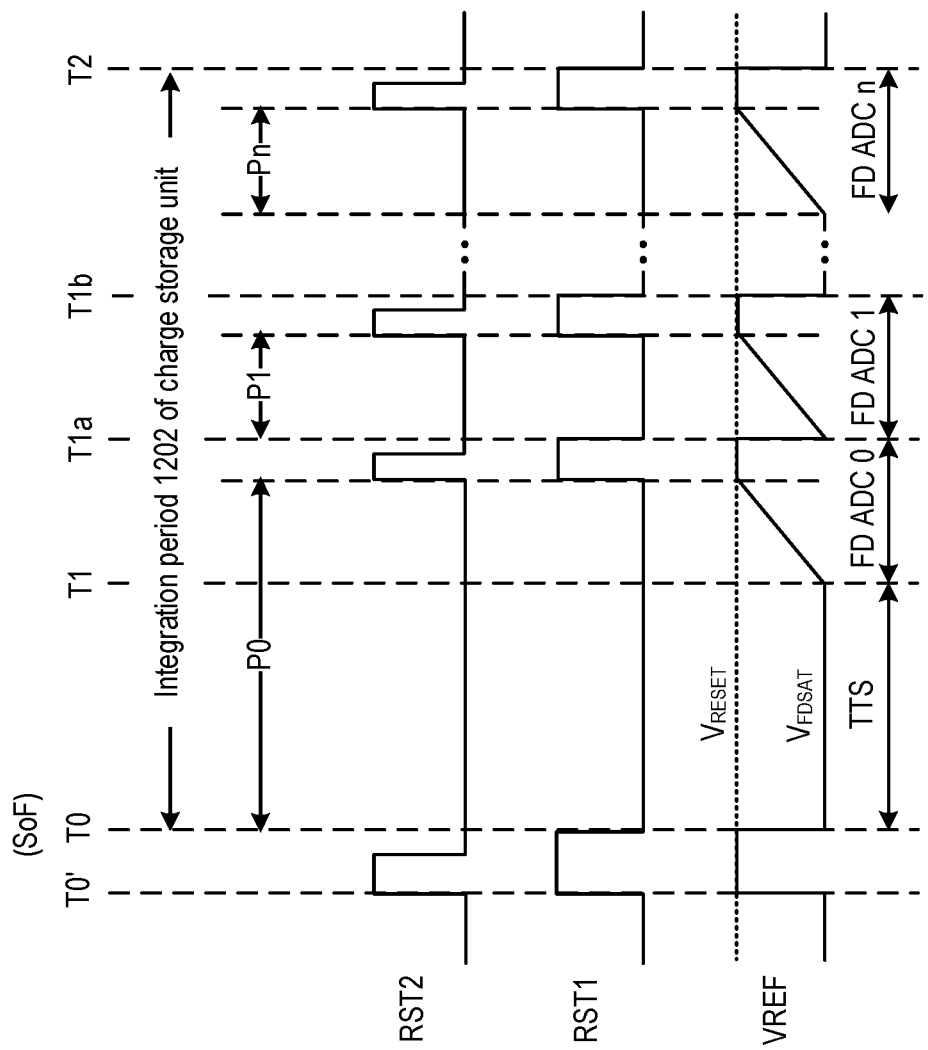

FIG. 14A-FIG. 14C illustrate other example configurations of operations of pixel cell 1100. As shown in FIG. 14A, instead of a single FD ADC operation, multiple FD ADC operations can be performed to quantize the OF node voltage within integration period 1202 of charge storage unit 608a. For example, controller 1110 can restart counter 808 at time T1, and a first FD ADC operation (labelled "FD ADC 0" in FIG. 14A) can be performed between times T1 and T1a, in which comparator 1102 compares the OF node voltage against first ramping VREF that ramps from $V_{FDSAT}$ to $V_{RESET}$, and a first count from counter 808 can be stored in memory 810 when the output of comparator 1102 indicates that the OF node voltage crosses the first ramping VREF. The first count can represent a first sample of the OF node voltage as well as a first quantity of overflow charge accumulated at charge storage unit 608a at or before time T1a. Counter 808 can then restart at time T1a, and a second FD ADC operation (labelled "FD ADC 1" in FIG. 14A) can be performed between times T1a and T1b, in which comparator 1102 compares the OF node voltage against first ramping VREF that ramps from $V_{FDSAT}$ to $V_{RESET}$, and a second count from counter 808 can be stored in memory 810 when the output of comparator 1102 indicates that the OF node voltage crosses the first ramping VREF. The second count can represent a second sample of the OF node voltage as well as a second quantity of overflow charge accumulated at charge storage unit 608a at or before time T1b. Additional FD ADC operations (e.g., FD ADC n) can be performed to generate additional samples. The number of FD ADC operations can be specified in programming data 1120, based on which controller 1110 can control the timing of restarting of counter 808, as well as the timing of generation of the first ramping VREF, to generate the multiple samples.

The multiple voltage samples can be stored in memory 810 and provided to intensity output module 1124 to determine an intensity of incident light. To support the multiple sampling/quantization operations, memory 810 can include multiple memory banks/devices to store the multiple quantization results, which can then be provided intensity output module 1124. The multiple memory banks/devices can also be used to store the quantization results from the TTS, FD ADC, and PD ADC operations separately instead of, for example, overwriting the quantization result of TTS with the quantization results of a subsequent stage (e.g., FD ADC, PD ADC, etc.). Therefore, in some examples, the checkings 1212 and 1214 in FIG. 12, which provide indications of whether the quantization result stored in memory 810 from a prior stage can be replaced with the output of a subsequent stage, can be omitted.

FIG. 14B illustrates example patterns of voltage samples obtained from the multiple FD ADC operations. Graph 1402 illustrates an example pattern of voltage samples with respect to time. In the example pattern illustrated in graph 1402, the voltage sample values decrease at a constant rate with respect to time, which can reflect that charge storage unit 608a accumulates overflow charge at a constant rate. The rate of accumulation of the overflow charge, as well as the rate of change of the voltage samples, can correlate with the incident light intensity, with higher intensity leading to a higher rate of change of the voltage samples and vice versa for a lower intensity. As such, intensity output module 1124 can determine the incident light intensity based on the rate of change of the voltage sample values. In the example of graph 1402, intensity output module 1124 can determine the rate of change of the sampled voltage between different samples (e.g., between v0 and v1, v1 and v2, v2 and v3, etc.), and determine an average rate of change. Intensity output module 1124 can then determine the intensity of the incident light based on the average rate of change of the sampled voltage. In some examples, intensity output module 1124 can also determine the intensity of the incident light based on the average rate of change of the sampled voltage across multiple image frames.

Determining the incident light intensity based on the rate of change, as opposed to being based on a difference between the $V_{FDSAT}$ (or $V_{RESET}$) and a particular sampled voltage (when it crosses the ramping VREF), can provide various benefits. For example, the reset noise and quantization noise can be reduced by averaging. Moreover, the voltage samples can be obtained and quantized at a high sampling frequency, which can reduce 1/f noise and improve the accuracy of the FD ADC operation. Moreover, the intensity measurement can become more resilient to sources of mismatch like delays in the ramp or clock signal, which can either reduce or eliminate the need for calibration of these noise sources.

Graph 1404 illustrates another example pattern of voltage samples with respect to time. In the example pattern illustrated in graph 1404, the voltage sample values decreases at a first rate with respect to time between times t0 and t3, and then decreases at a much smaller second rate (or stays constant) with respect to time between times t3 and t7. The much slower second rate can indicate that charge storage unit 608a is saturated with overflow charge. Intensity output module 1124 can detect the substantial decrease in the rate of change of the voltage samples starting at time t3, and use the first rate of change of the voltage samples between times t0 and t3 to determine the incident light intensity. Such arrangements can also allow skipping the TTS operation (e.g., to accommodate the reduced integration period 1202 of charge storage unit 608a), and/or designating the TTS operation for a much higher intensity range while extending the upper intensity limit of the FD ADC operation beyond the saturation threshold 704 of FIG. 7A, etc., which can extend the dynamic range of pixel cell 1100.

FIG. 14C illustrates another example configuration of operations of pixel cell 1100. In FIG. 14C, multiple FD ADC operations can be performed to quantize the OF node voltage, but charge storage unit 608a and comparator 1102 are reset at the end of each FD ADC operation, which can split up integration period 1202 into multiple sub-periods including integration period P0, P1, Pn, etc. In the example of FIG. 14C, intensity output module 1124 can determine the incident light intensity based on averaging the sampled voltages. The arrangements in FIG. 14C can also the reset noise, quantization noise, and 1/f noise to improve the accuracy of the FD ADC operation. Moreover, the intensity measurement can become more resilient to sources of mismatch like delays in the ramp or clock signal, which can either reduce or eliminate the need for calibration of these noise sources.

Figure 15:
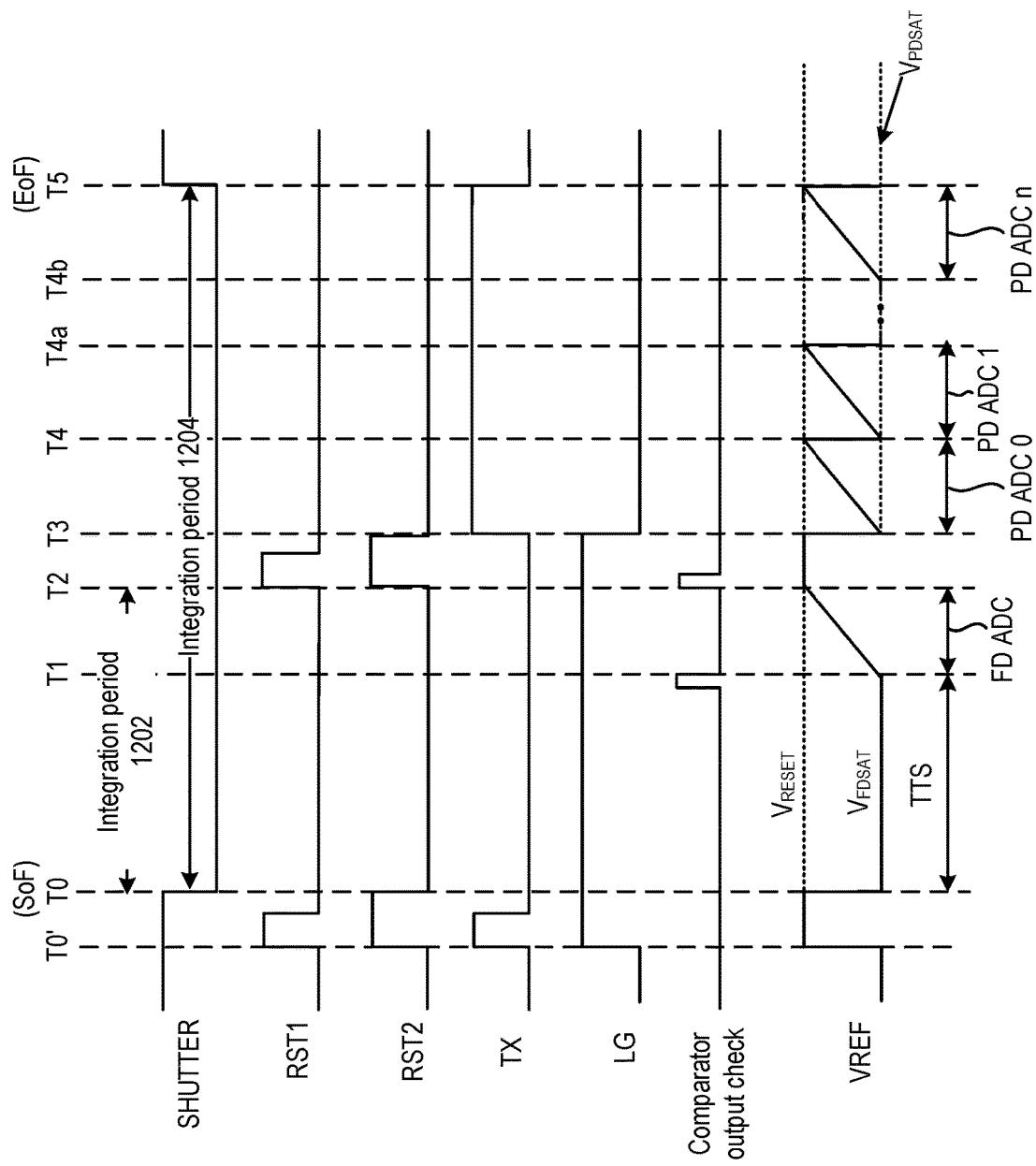
FIG. 15 illustrates another example sequence of control signals to perform light intensity measurement.

FIG. 15 illustrates other example configurations of operations of pixel cell 1100. As shown in FIG. 15, instead of a single PD ADC operation, multiple PD ADC operations can be performed in the period between T3 and T5. To perform multiple PD ADC operations, controller 1110 can set bias TX to $V_{HIGH}$ to fully turn on transistor M1 in the period between T3 and T5, while keeping the shutter switch disabled, to enable photodiode PD to generate charge and transfer the charge to charge storage unit 608a. Controller 1110 can restart counter 808 at time T3, and a first PD ADC operation (labelled "PD ADC 0" in FIG. 15) can be performed between times T3 and T3a, in which comparator 1102 compares the OF node voltage against second ramping VREF that ramps from $V_{PDSAT}$ to $V_{RESET}$, and a first count from counter 808 can be stored in memory 810 when the output of comparator 1102 indicates that the OF node voltage crosses the second ramping VREF. The first count can represent a first sample of the OF node voltage as well as a first quantity of charge generated by photodiode PD (and transferred to charge storage unit 608a) at or before time T3a. Counter 808 can then restart at time T3a, and a second PD ADC operation (labelled "PD ADC 1" in FIG. 15) can be performed between times T1a and T1b, in which comparator 1102 compares the OF node voltage against first ramping VREF that ramps from $V_{FDSAT}$ to $V_{RESET}$, and a second count from counter 808 can be stored in memory 810 when the output of comparator 1102 indicates that the OF node voltage crosses the second ramping VREF. The second count can represent a second sample of the OF node voltage as well as a second quantity of charge generated by photodiode PD at or before time T3b. Additional PD ADC operations (e.g., PD ADC n) can be performed to generate additional samples. The number of PD ADC operations can be specified in programming data 1120, based on which controller 1110 can control the timing of restarting of counter 808, as well as the timing of generation of the second ramping VREF, to generate the multiple samples. The multiple voltage samples can be stored in memory 810. Intensity output module 1124 can determine the intensity of incident light based on, for example, determining a rate of change of the sampled voltages.

Figure 16:
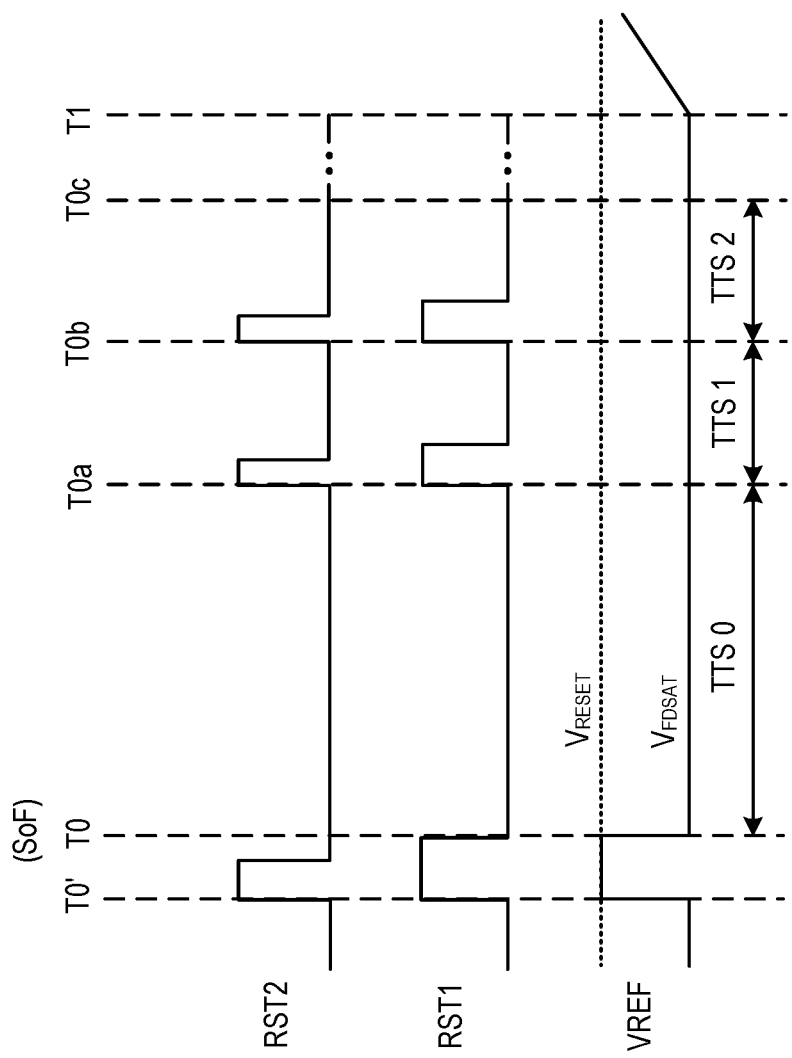
FIG. 16 illustrates another example sequence of control signals to perform light intensity measurement.

FIG. 16 illustrates other example configurations of operations of pixel cell 1100. As shown in FIG. 16, instead of a single TTS operation, multiple TTS operations can be performed in the period between T0 and T1. To perform multiple TTS operations, controller 1110 can restart counter 808 at time T0 to perform a first TTS operation (labelled "TTS 0" in FIG. 16) between times T0 and T0a, in which comparator 1102 compares the OF node voltage against a static threshold voltage $V_{FDSAT}$, and a first count from counter 808 can be stored in memory 810 when the output of comparator 1102 indicates that the OF node voltage crosses the second ramping VREF. The first count can represent a first sample of the time-to-saturation of OF node voltage. Controller 1110 can then assert RST1 and RST2 to reset, respectively, charge storage unit 608a and comparator 1102, and restart counter 808 at time T0a, a second PD ADC operation (labelled "TTS 1" in FIG. 16) can be performed between times T0a and T0b, and a third PD ADC operation (labelled "TTS 2" in FIG. 16) can be performed between times T0b and T0c. Additional TTS operations (e.g., TTS n) can be performed to generate additional samples. The number of TTS operations can be specified in programming data 1120, based on which controller 1110 can control the timing of restarting of counter 808, as well as the timing of generation of RST1 and RST2, to generate the multiple time-to-saturation samples. The multiple time-to-saturation samples can be stored in memory 810 and provided to intensity output module 1124.

Intensity output module 1124 can determine the incident light intensity based on the multiple time-to-saturation samples based on various techniques. In some examples, intensity output module 1124 can count the number of time-to-saturation samples and determine the intensity based on the number. For example, a higher number can indicate a higher light intensity. In some examples, a fixed number of time-to-saturation samples can be collected, and the last time-to-saturation sample can be used to determine the incident light intensity. In some examples, intensity output module 1124 can also determine the incident light intensity based on an average of the time-to-saturation samples.

Figure 17:
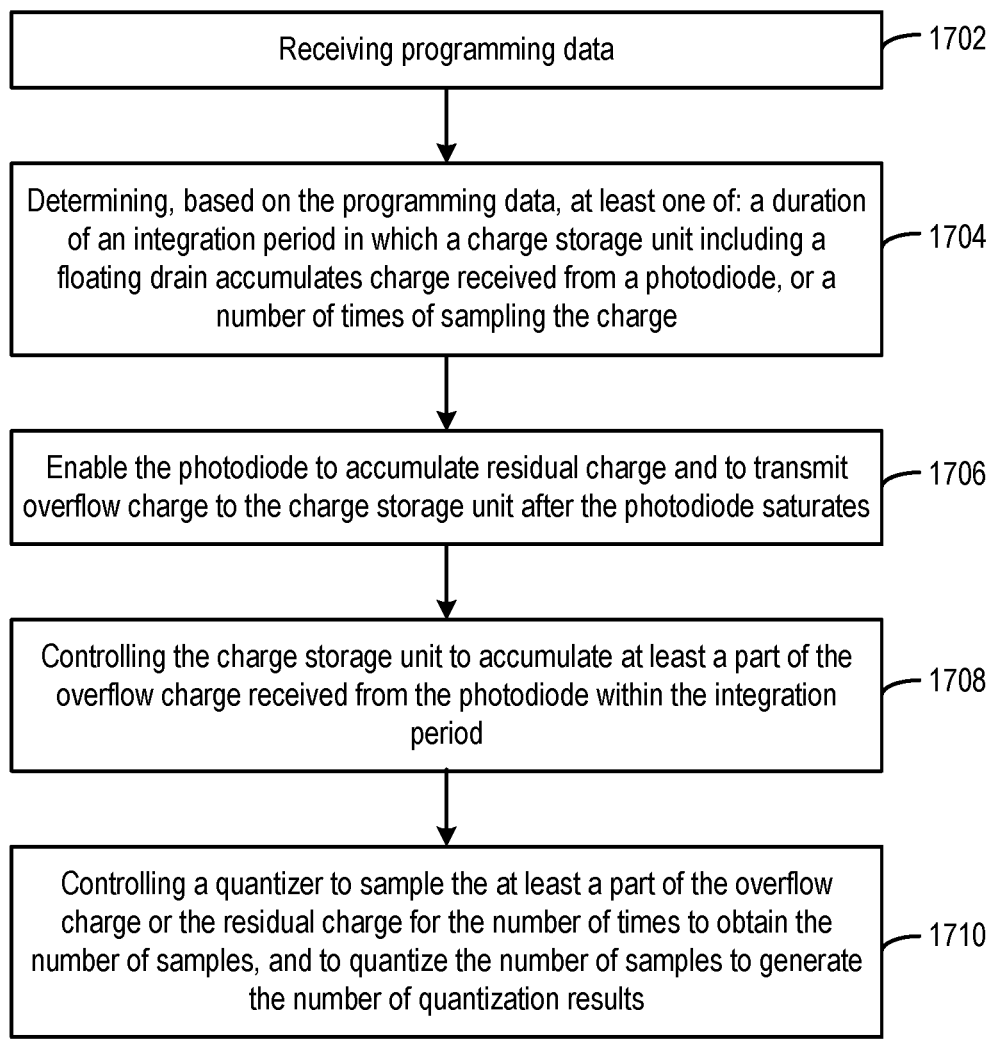
FIG. 17 illustrates a flowchart of an example process for measuring light intensity.

FIG. 17 illustrates a flowchart of an example method 1700 for measuring light intensity. Method 1700 can be performed by, for example, controller 1110 of pixel cell 1100 of FIG. 11.

Method 1700 starts with step 1702, in which controller 1110 receives programming data (e.g., programming data 1120) from a host device that operates an application. The programming data can configure the light intensity measurement operation at pixel cell 1100. The configuration can include, for example, setting the duration of the integration period of charge at charge storage unit 608a, omitting one or more of the three-phase measurement processes, repeating one or more of the three phase measurement processes to quantize multiple samples of the incident light intensity, etc., and can be based on the application operating at the host device.

In step 1704, controller 1110 can determine, based on the programming data, at least one of: a duration of an integration period in which a charge storage unit including a floating drain (e.g., charge storage unit 608a) accumulates charge received from a photodiode, or a number of times of sampling the charge. The integration period of charge storage unit 608 can indicate a duration of time period provided for accumulation of overflow charge for TTS and/or FD ADC measurement operations, whereas the number of times of sampling charge can indicate a number of times one or more of the TTS, FD ADC, and PD ADC measurement operations are repeated to measure the light intensity.

In step 1706, controller 1110 can enable the photodiode to accumulate residual charge and to transmit overflow charge to the charge storage unit after the photodiode saturates. The controller can enable the photodiode to accumulate charge by, for example, releasing the shutter switch to start an integration period of the photodiode. The start of the integration period of the photodiode can correspond to a start of frame (SoF).

In step 1708, controller 1110 can control the charge storage unit to accumulate at least a part of the overflow charge received from the photodiode with the integration period of the charge storage unit. The duration of the integration period of the charge storage unit can be configured based on the programming data. In some examples, controller 1110 can set the duration of the integration period of the charge storage unit based on controlling the timing of a first reset phase of the charge storage unit beyond the SoF (as shown in FIG. 13A) and/or based on controlling the timing of the second reset phase of the charge storage unit before PD ADC (as shown in FIG. 13B).

In step 1710, controller 1110 can control a quantizer (e.g., pixel ADC 610) to sample the at least a part of the overflow charge or the residual charge for the number of times to obtain the number of samples, and to quantize the number of samples to generate the number of quantization results. The number of samples can be configured based on the programming data. In some examples, voltage samples can be obtained as the charge storage unit continues to accumulate the overflow charge (e.g., in FD ADC operation) or the residual charge (e.g., in PD ADC operation), and each voltage can be quantized based on comparing against a ramping threshold and storing a count value in a memory based on the comparison result. A rate of change of the voltage samples with respect to time can be determined, and the intensity of incident light can be determined based on the rate of change. In some examples, the charge storage unit can be reset prior to the quantizer obtaining each sample (e.g., a voltage sample, a time-to-saturation sample, etc.) and quantizing the sample, and the intensity of incident light can be determined based on an average of the quantization results.

The foregoing description of the examples of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the examples of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some examples, a software module is implemented with a computer program product comprising a computer-readable medium containing computer program code, which can be executed by a computer processor for performing any or all of the steps, operations, or processes described.

Examples of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples of the disclosure may also relate to a product that is produced by a computing process described herein. Such a product may comprise information resulting from a computing process, where the information is stored on a non-transitory, tangible computer readable storage medium and may include any example of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the examples is intended to be illustrative, but not limiting, of the scope of the disclosure, which is set forth in the following claims.

What is claimed is:

1. An apparatus comprising:
   a photodiode;
   a charge storage unit including a floating drain;
   a quantizer;
   a controller configured to:
      receive programming data;
      determine, based on the programming data, at least one of: an integration period in which the charge storage unit accumulates charge received from the photodiode, or a number of times of sampling the charge received from the photodiode by the quantizer;
      enable the photodiode to accumulate residual charge, and to transmit overflow charge to the charge storage unit after the photodiode saturates;
      control the charge storage unit to accumulate at least a part of the overflow charge received from the photodiode within the integration period; and
      control the quantizer to:
         sample the at least a part of the overflow charge or the residual charge for the number of times to obtain the number of samples, and
         quantize the number of samples to generate a number of quantization results.

2. The apparatus of claim 1, wherein the controller is configured to:
   at a first time, enable the photodiode to start accumulating the residual charge;
   release the charge storage unit from a reset state starting at a second time after the first time; and
   reset the charge storage unit at a third time after the second time and
   wherein the controller is configured set the at least one of the second time or the third time based on the programming data.

3. The apparatus of claim 2, wherein the integration period is a first integration period and starts at the second time; and
   wherein a second integration period of the photodiode starts at the first time.

4. The apparatus of claim 3, further comprising:
   a shutter switch coupled between the photodiode and a first charge sink; and
   a reset switch coupled between the charge storage unit and a second charge sink.

5. The apparatus of claim 4,
   wherein the controller is configured to:
      at the first time, disable the shutter switch to start the second integration period;
      at the second time, disable the reset switch to start the first integration period; and
      at the third time, enable the reset switch to stop the first integration period.

6. The apparatus of claim 5, further comprising a transfer switch coupled between the photodiode and the charge storage unit, the transfer switch comprising a gate and the floating drain of the charge storage unit;
   wherein the controller is configured to:
      within the first integration period and the second integration period, transmit a first control signal to a gate of the transfer switch to enable the photodiode to store the residual charge; and
      within the first integration period, control the quantizer to quantize a first number of samples of the at least a part of the overflow charge accumulated at the charge storage unit.

7. The apparatus of claim 6, wherein the controller is configured to, after the third time:
   disable the reset switch;

transmit a second control signal to the gate of the transfer switch to transfer the residual charge from the photodiode to the charge storage unit;
enable the shutter switch to stop both the first integration period and the second integration period; and
after the first integration period and the second integration period end, control the quantizer to quantize the residual charge accumulated at the charge storage unit.

8. The apparatus of claim 3, wherein the quantizer comprises a comparator, a counter, and a memory;
wherein the controller is configured to perform a quantization operation comprising:
controlling the counter to start counting from a start count value;
controlling the comparator to compare a voltage at the charge storage unit with one or more thresholds to generate a comparison result; and
based on the comparison result, controlling the memory to store a count value from the counter as a quantization result of a sample of the voltage.

9. The apparatus of claim 8, wherein the controller is configured to perform the number of the quantization operations based on the programming data to generate the number of the quantization results.

10. The apparatus of claim 9, wherein the controller is configured to, in each of the number of the quantization operations, control the comparator to compare the voltage with a ramping threshold to determine a quantity of the overflow charge or a quantity of the residual charge stored at the charge storage unit.

11. The apparatus of claim 10, wherein the controller is configured to generate an output representing an intensity of incident light received by the photodiode based on a rate of change among the number of quantization results.

12. The apparatus of claim 11, wherein the controller is configured to:
determine a first rate of change among a first subset of the number of quantization results;
determine a second rate of change among a second subset of the number of quantization results; and
based on a relationship between the first rate of change and the second rate of change, generate the output based on the first rate of change.

13. The apparatus of claim 12, wherein the controller is configured to:
based on the relationship, determine that the charge storage unit is saturated when the samples of the voltage represented by the second subset of the number of quantization results are obtained; and
based on the determination, generate the output based on the first rate of change.

14. The apparatus of claim 10, wherein the controller is configured to:
in each of the number of quantization operations, reset the charge storage unit; and
generate an output representing an intensity of incident light received by the photodiode based on an average of the number of quantization results.

15. The apparatus of claim 14, wherein the controller is configured to, in each of the number of quantization operations, control the comparator to compare the voltage with a static threshold; and
wherein each of the number of quantization results represent a time for the charge storage unit to become saturated by the overflow charge.

16. The apparatus of claim 10, wherein the controller is configured to perform the number of quantization operations within the first integration period to quantize the at least a part of the overflow charge.

17. The apparatus of claim 10, wherein the controller is configured to perform the number of quantization operations within the second integration period to quantize the residual charge.

18. The apparatus of claim 1, wherein the integration period is determined based on the number of times of sampling the charge.

19. The apparatus of claim 1, wherein the number of times of sampling the charge is determined based on the programming data.

20. The apparatus of claim 1, wherein the integration period is a first integration period;
wherein the controller is configured to:
determine a second integration period based on the programming data; and
enable the photodiode to accumulate the residual charge within the second integration period.

21. The apparatus of claim 20, wherein the first integration period and the second integration period have different start times.

22. The apparatus of claim 21, wherein the controller is configured to:
reset the photodiode; and
start the second integration period based on releasing the reset of the photodiode.

23. The apparatus of claim 21, wherein the controller is configured to:
reset at least one of the quantizer during at least a part of the second integration period; and
start the first integration period based on releasing the reset of the quantizer.

24. A method comprising:
receiving programming data;
determining, based on the programming data, at least one of: an integration period in which a charge storage unit including a floating drain accumulates charge received from a photodiode, or a number of times of sampling the charge;
enabling the photodiode to accumulate residual charge, and to transmit overflow charge to the charge storage unit after the photodiode saturates;
controlling the charge storage unit to accumulate at least a part of the overflow charge received from the photodiode within the integration period;
controlling a quantizer to sample the at least a part of the overflow charge or the residual charge for the number of times to obtain the number of samples; and
controlling the quantizer to quantize the number of samples to generate a number of quantization results.

25. The method of claim 24, further comprising:
at a first time, enabling the photodiode to start accumulating the overflow charge;
starting at a second time after the first time, releasing the charge storage unit from a reset state; and
resetting the charge storage unit at a third time after the second time,
wherein a duration of the integration period is set based on at least one of the second time or the third time.

26. The method of claim 24, further comprising:
performing the number of quantization processes, each of the quantization processes comprising:
controlling a counter of quantizer to start counting from a start count value;

controlling a comparator of quantizer to compare a voltage at the charge storage unit with one or more thresholds to generate a comparison result; and based on the comparison result, controlling a memory to store a count value from the counter as a quantization result of a sample of the voltage.

\* \* \* \* \*